(12) United States Patent
Li et al.

(10) Patent No.: US 11,848,603 B2
(45) Date of Patent: Dec. 19, 2023

(54) AUXILIARY POWER SUPPLY APPARATUS AND METHOD FOR ISOLATED POWER CONVERTERS

(71) Applicant: Huawei Digital Power Technologies Co., Ltd., Shenzhen (CN)

(72) Inventors: Yushan Li, Allen, TX (US); Liming Ye, Plano, TX (US); Heping Dai, Plano, TX (US)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/064,816

(22) Filed: Dec. 12, 2022

(65) Prior Publication Data

US 2023/0133307 A1 May 4, 2023

Related U.S. Application Data

(60) Continuation of application No. 16/865,762, filed on May 4, 2020, now Pat. No. 11,527,960, which is a division of application No. 15/819,209, filed on Nov. 21, 2017, now Pat. No. 10,644,607.

(60) Provisional application No. 62/540,998, filed on Aug. 3, 2017.

(51) Int. Cl.
| | |
|---|---|
| *H02M 3/335* | (2006.01) |
| *H02M 1/40* | (2007.01) |
| *H02M 1/08* | (2006.01) |
| *H02M 3/00* | (2006.01) |

(52) U.S. Cl.
CPC .............. *H02M 1/40* (2013.01); *H02M 1/08* (2013.01); *H02M 3/33569* (2013.01); *H02M 3/33592* (2013.01); *H02M 3/00* (2013.01); *H02M 3/33573* (2021.05)

(58) Field of Classification Search
None
See application file for complete search history.

(56) References Cited

U.S. PATENT DOCUMENTS

| | | | | |
|---|---|---|---|---|
| 4,975,821 | A | 12/1990 | Lethellier | |
| 5,019,957 | A * | 5/1991 | Wilkinson | ........ H02M 3/33569 |
| | | | | 361/111 |
| 6,947,297 | B2 * | 9/2005 | Ke | ..................... H02M 3/33569 |
| | | | | 363/20 |
| 10,644,607 | B2 * | 5/2020 | Li | ........................... H02M 1/08 |
| 11,527,960 | B2 * | 12/2022 | Li | ........................... H02M 1/40 |

(Continued)

FOREIGN PATENT DOCUMENTS

| | | |
|---|---|---|
| CN | 101847933 A | 9/2010 |
| CN | 102122890 A | 7/2011 |

(Continued)

*Primary Examiner* — Jeffrey A Gblende
(74) *Attorney, Agent, or Firm* — Slater Matsil, LLP

(57) ABSTRACT

An apparatus includes a controller configured to generate a PWM signal for controlling a power switch of a forward converter, a bias switch and a bias capacitor connected in series and coupled to a bias winding of the forward converter, and a comparator having a first input connected to the bias capacitor, a second input connected to a predetermined reference and an output configured to generate a signal for controlling the bias switch to allow a magnetizing current from the bias winding to charge the bias capacitor when a voltage across the bias capacitor is less than the predetermined reference.

20 Claims, 23 Drawing Sheets

(56) References Cited

U.S. PATENT DOCUMENTS

| | | |
|---|---|---|
| 2001/0054881 A1 | 12/2001 | Watanabe |
| 2002/0067629 A1* | 6/2002 | Koike ............... H02M 3/33523 363/97 |
| 2004/0156217 A1* | 8/2004 | Phadke ............. H02M 3/33569 363/21.16 |
| 2005/0036339 A1 | 2/2005 | Zverev et al. |
| 2007/0047269 A1 | 3/2007 | Hachiya |
| 2010/0226154 A1 | 9/2010 | Leu |
| 2010/0246215 A1 | 9/2010 | Mase et al. |
| 2011/0222319 A1 | 9/2011 | Marumo et al. |
| 2014/0098579 A1 | 4/2014 | Kleinpenning |
| 2014/0362612 A1 | 12/2014 | Shi et al. |
| 2015/0003118 A1 | 1/2015 | Shin et al. |
| 2015/0016153 A1 | 1/2015 | Orr et al. |
| 2015/0162841 A1 | 6/2015 | Masuda et al. |

FOREIGN PATENT DOCUMENTS

| | | |
|---|---|---|
| CN | 103715901 A | 4/2014 |
| CN | 103795260 A | 5/2014 |

* cited by examiner

AUXILIARY POWER SUPPLY APPARATUS AND METHOD FOR ISOLATED POWER CONVERTERS

This application is a continuation of U.S. application Ser. No. 16/865,762 filed May 4, 2020, now U.S. Pat. No. 11,527,960 issued Dec. 13, 2022, entitled "Auxiliary Power Supply Apparatus and Method for Isolated Power Converters," which is a divisional of U.S. application Ser. No. 15/819,209 filed Nov. 21, 2017, now U.S. Pat. No. 10,644,607 issued May 5, 2020, entitled "Auxiliary Power Supply Apparatus and Method for Isolated Power Converters," which claims the benefit of U.S. Provisional Application No. 62/540,998, filed on Aug. 3, 2017, entitled "Auxiliary Power Supply Apparatus and Method," each application is hereby incorporated herein by reference.

TECHNICAL FIELD

The present disclosure relates to an auxiliary power supply, and more particularly, to an auxiliary power supply employed in a switching power converter.

BACKGROUND

A power supply system (e.g., an adaptor) is used to convert an alternating current (ac) voltage from the utility company into a direct current (dc) voltage suitable for electronic devices. The power supply system usually includes an ac/dc stage (e.g., a rectifier) and an isolated dc/dc stage (e.g., an isolated dc/dc converter). The ac/dc stage converts the power from the ac utility line and establishes a dc bus for the isolated dc/dc stage. The ac/dc stage may comprise a variety of electromagnetic interference (EMI) filters and a bridge rectifier formed by four diodes. The EMI filters are employed to attenuate both differential mode noise and common mode noise. The bridge rectifier converts the ac voltage into a full-wave rectified dc voltage. Such a full-wave rectified dc voltage provides a steady dc input voltage for the isolated dc/dc stage through a plurality of smoothing capacitors coupled to the output of the bridge rectifier.

The isolated dc/dc stage converts the voltage of the dc bus to a voltage suitable to electronics loads such as tablets, printers, mobile phones, personal computers, any combinations thereof and the like. The isolated dc/dc stage can be implemented by using different power topologies, such as flyback converters, forward converters, half bridge converters, full bridge converters and the like.

In some applications (e.g., an adaptor for powering a personal computer), a flyback converter is employed to regulate the output voltage. The flyback converter includes a transformer, which provides galvanic isolation for satisfying various safety requirements. The flyback converter may comprise three controllers, namely a primary side controller placed at the primary side for driving a main switch of the flyback converter, a synchronous rectifier controller placed at the secondary side for controlling the on and off of the synchronous switch to reduce secondary side conduction losses, and a secondary side controller placed at the secondary side for sensing the output voltage and communicating with the primary side controller for achieve various system functions such as closed-loop regulation, universal serial bus (USB) power delivery protocols and the like.

All three controllers above may have their individual internal linear or low drop out (LDO) regulators to maintain a regulated bias voltage. In order to meet USB 3.0 type C Power Delivery (PD) specification, the output voltage of the flyback converter is in a wide range from about 3 V to about 20 V to. Such a wide output voltage range may cause extra power losses at the LDO regulators.

SUMMARY

These and other problems are generally solved or circumvented, and technical advantages are generally achieved, by preferred embodiments of the present disclosure which provide an auxiliary power supply employed in a switching power converter.

In accordance with an embodiment, an apparatus comprises a pulse-width modulation (PWM) generator configured to generate a PWM signal for controlling a power switch of a power converter, a bias switch and a bias capacitor connected in series and coupled to a magnetic winding of the power converter and a comparator having a first input connected to the bias capacitor, a second input connected to a predetermined reference and an output configured to generate a signal for controlling the bias switch to allow a magnetizing current from the magnetic winding to charge the bias capacitor when a voltage across the bias capacitor is less than the predetermined reference.

In accordance with another embodiment, a method comprises detecting a voltage across a bias capacitor of a power converter, comparing the voltage across the bias capacitor with a first predetermined threshold, turning on a bias switch connected in series with the bias capacitor and using a magnetizing current to charge the bias capacitor when the voltage across the bias capacitor drops below the first predetermined threshold and turning off the bias switch after the voltage across the bias capacitor is above a second predetermined threshold greater than the first predetermined threshold.

In accordance with yet another embodiment, a system comprises a PWM generator configured to generate a PWM signal for controlling a power switch of a power converter, a first bias switch and a first bias capacitor connected in series and coupled to a first magnetic winding of the power converter, a first comparator having a first input connected to the first bias capacitor, a second input connected to a first predetermined reference and an output configured to generate a signal for controlling the first bias switch to allow a magnetizing current to charge the first bias capacitor when a voltage across the first bias capacitor is less than the first predetermined reference, a second bias switch and a second bias capacitor connected in series and coupled to a second magnetic winding of the power converter, wherein the second magnetic winding is magnetically coupled to the first magnetic winding and a second comparator having a first input connected to the second bias capacitor, a second input connected to a second predetermined reference and an output configured to generate a signal for controlling the second bias switch to allow the magnetizing current to charge the second bias capacitor when a voltage across the second bias capacitor is less than the second predetermined reference.

An advantage of an embodiment of the present disclosure is improving efficiency of a bias power supply by charging the bias capacitor of the bias power supply only when it is necessary. Furthermore, the charge current is diverted from a magnetizing current of the switching power converter. It does not require a dedicated power source for charging the bias capacitor.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely an auxiliary power supply employed in a switching power converter. The disclosure may also be applied, however, to a variety of isolated power converters including half bridge converters, full bridge converters, flyback converters, forward converters, push-pull converters, inductor-inductor-capacitor (LLC) resonant converter and the like. Furthermore, the disclosure may also be applied to a variety of non-isolated power converters such as four switch buck boost converters and the like. Hereinafter, various embodiments will be explained in detail with reference to the accompanying drawings.

Figure 1:
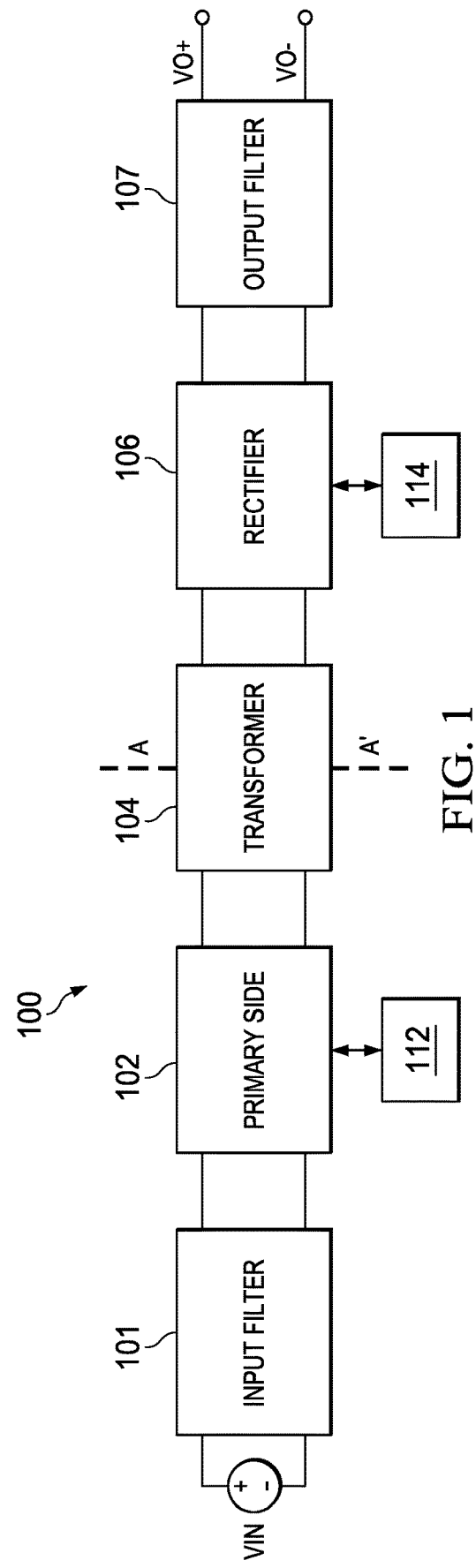
FIG. 1 illustrates a block diagram of a switching power converter in accordance with various embodiments of the present disclosure.

FIG. 1 illustrates a block diagram of a switching power converter in accordance with various embodiments of the present disclosure. The switching power converter 100 comprises an input filter 101, a primary side network 102, a transformer 104, a rectifier 106 and an output filter 107. In addition, a primary side controller 112 is placed at the primary side of the switching power converter 100. A secondary side controller 114 is placed at the secondary side of the switching power converter 100.

It should be noted that as indicated by a dashed line A-A', the left side of the dashed line including the input dc source VIN, the input filter 101 and the primary side network 102 is commonly referred to as the primary side of the switching power converter 100. On the other hand, the right side of the dashed line A-A' including the rectifier 106 and the output filter 107 is commonly referred to as the secondary side of the switching power converter 100. Furthermore, as shown in FIG. 1, the transformer 104 is placed between the primary side and the secondary side. In fact, the transformer 104 provides electrical isolation between the primary side and the secondary side of the switching power converter 100.

The primary side network 102 is coupled to the input dc source VIN through the input filter 101. Depending on different power converter topologies, the primary side network 102 may comprise different combinations of switches as well as passive components. For example, the primary side network 102 may comprise four switching elements connected in a bridge configuration when the switching power converter 100 is a full bridge power converter. On the other hand, when the switching power converter 100 is an LLC resonant converter, the primary side network 102 may comprise a high side switching element and a low side switching element connected in series, and a resonant tank formed by an inductor and a capacitor connected in series.

Furthermore, when the switching power converter 100 is a forward converter (e.g., an active clamp forward converter), the primary side network 102 may comprise a primary switch and an active clamp reset device formed by an auxiliary switch and a clamp capacitor. Moreover, the switching power converter 100 may be a flyback converter. The primary side network 102 may comprise a primary switch and a reset device formed by a clamp capacitor, a resistor and a diode.

The switching elements of the primary side network 102 may be formed by any suitable devices such as metal oxide semiconductor field effect transistor (MOSFET) devices, bipolar junction transistor (BJT) devices, super junction transistor (SJT) devices, insulated gate bipolar transistor (IGBT) devices and the like.

It should be noted that one of ordinary of skill in the art would realize that the switching power converter 100 as well as its corresponding primary side network 102 may be implemented in many different ways. It should further be noted that the power converter topologies discussed herein are provided for illustrative purposes only, and are provided only as examples of various embodiments.

The input filter 101 may comprise an inductor coupled between the input dc source VIN and the primary side network 102. The input filter 101 may further comprise a plurality of input capacitors. The inductor provides high impedance when switching noise tries to flow out of the primary side network 102. At the same time, the input capacitors shunt the input of the switching power converter 100 and provide a low impedance channel for the switching noise generated from the primary side network 102. As a result, the switching noise of the switching power converter 100 may be prevented from passing through the input filter 101. The structure and operation of the input filter of an isolated dc/dc converter are well known in the art, and hence are not discussed in further detail.

The transformer 104 provides electrical isolation between the primary side and the secondary side of the switching power converter 100. In accordance with some embodiments, the transformer 104 may be formed of two transformer windings, namely a primary transformer winding and a secondary transformer winding. Alternatively, the transformer 104 may have a center tapped secondary so as to have three transformer windings including a primary transformer winding, a first secondary transformer winding and a second secondary transformer winding. Moreover, the transformer may comprise a plurality of bias windings.

It should be noted that the transformers illustrated herein and throughout the description are merely examples, which should not unduly limit the scope of the claims. One of ordinary skill in the art would recognize many variations, alternatives, and modifications. For example, the transformer 104 may further comprise a variety of gate drive auxiliary windings and the like.

The rectifier 106 converts an alternating polarity waveform received from the output of the transformer 104 to a single polarity waveform. The rectifier 106 may be formed of a pair of switching elements such as NMOS transistors. Alternatively, the rectifier 106 may be formed of a single switching element. Furthermore, the rectifier 106 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices and the like. The detailed operation and structure of the rectifier 106 are well known in the art, and hence are not discussed herein.

The output filter 107 is employed to attenuate the switching ripple of the switching power converter 100. According to the operation principles of switching power converters, the output filter 107 may be an L-C filter formed by an inductor and a plurality of capacitors. One person skilled in the art will recognize that some switching power converter topologies such as forward converters and full bridge converters may require an L-C filter. On the other hand, some switching power converter topologies such as flyback converters and LLC resonant converters may include an output filter formed by a capacitor or a plurality of capacitors connected in parallel. One person skilled in the art will further recognize that different output filter configurations apply to different power converter topologies as appropriate. The configuration variations of the output filter 107 are within various embodiments of the present disclosure.

FIG. 1 further comprises the primary side controller 112 and the secondary side controller 114. The primary side controller 112 may generate gate drive signals for the primary side network 102. The secondary side controller 114 may generate gate drive signals for the secondary side switching network 106. Both the primary side controller 112 and the secondary side controller 114 may comprise an auxiliary power supply. The auxiliary power supply is employed to provide bias power for the controllers. Throughout the description, the auxiliary power supply is alternatively referred to as a bias power supply.

In accordance with an embodiment, the primary side controller 112 may employ a peak current mode control mechanism to generate the gate drive signals based upon the comparison between a detected output voltage and a sensed current signal. Alternatively, the primary side controller 112 may employ a voltage mode control mechanism to generate the gate drive signals based upon the detected output voltage. However, as one having ordinary skill in the art will recognize, the control mechanisms described above are merely exemplary methods and are not meant to limit the current embodiments. Other control mechanisms, such as average current mode control scheme may alternatively be used. Any suitable control mechanisms may be used, and all such control mechanisms are fully intended to be included within the scope of the embodiments discussed herein.

Figure 2:
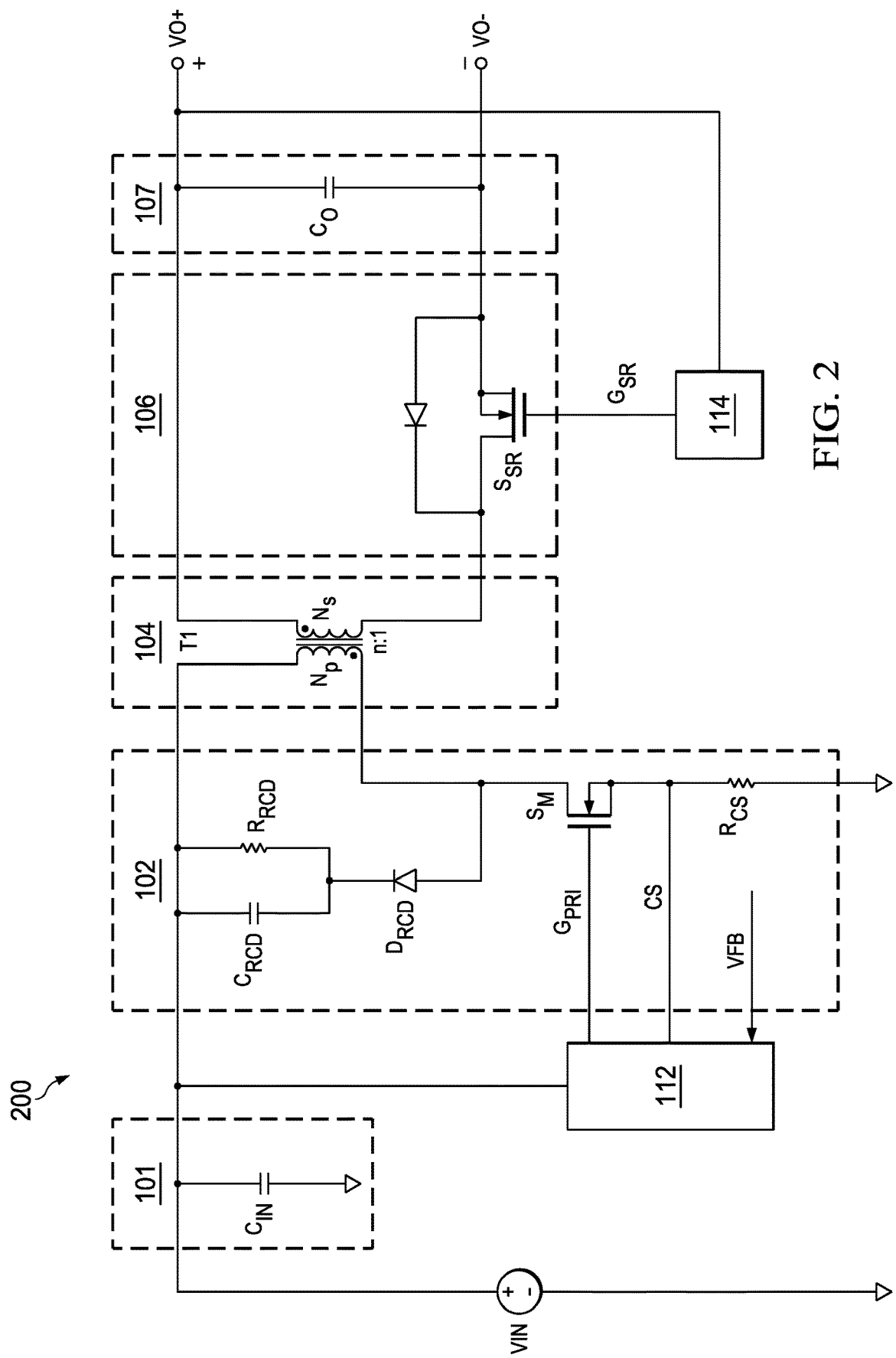
FIG. 2 illustrates a schematic diagram of a flyback converter in accordance with various embodiments of the present disclosure.

FIG. 2 illustrates a schematic diagram of a flyback converter in accordance with various embodiments of the present disclosure. An input voltage source VIN is coupled to a primary switch $S_M$ through the primary winding of the transformer 104. For simplicity, throughout the description, the transformer 104 is alternatively referred to as transformer T1 and the primary switch $S_M$ is alternatively referred to as a main switch.

The primary switch $S_M$ is connected between the primary winding $N_P$ and a current sense resistor $R_{CS}$. The current sense resistor $R_{CS}$ is further connected to ground as shown in FIG. 2. A reset device is connected in parallel with the primary winding $N_P$ of the transformer 104. The reset device is employed to reset the magnetizing current of the flyback converter 200.

As shown in FIG. 2, the reset device is formed by a diode $D_{RCD}$, a resistor $R_{RCD}$ and a clamp capacitor $C_{RCD}$. As shown in FIG. 2, the resistor $R_{RCD}$ and the clamp capacitor $C_{RCD}$ are connected in parallel. The diode $D_{RCD}$ is connected between a common node of the resistor $R_{RCD}$ and the clamp capacitor $C_{RCD}$, and a common node of the primary switch $S_M$ and the primary winding $N_P$. Throughout the description, the reset device shown in FIG. 2 is alternatively referred to as a RCD reset device.

In accordance with some embodiments, the primary switch $S_M$ is an n-type metal-oxide-semiconductor field-effect transistor (MOSFET) device. The clamp capacitor $C_{RCD}$ is a 0.1 uF ceramic capacitor. The resistance value of the resistor $R_{RCD}$ is in a range from about 1 Kohms to about 10 Kohms.

The primary side controller 112 may receive a plurality of signals such as a feedback signal VFB through an isolation device (not shown) placed between the primary side and the secondary side, a current sense signal CS detected from the current sense resistor $R_{CS}$, and an input voltage signal as shown in FIG. 2. Based upon the received signals, the primary side controller 112 generates a gate drive signal $G_{PRI}$ for driving the primary switch $S_M$. According to the operating principles of flyback converters, the amount of time D·T that the primary switch $S_M$ conducts current during a switching period T is determined by a duty cycle D. The duty cycle D may have a value from 0 to 1.

In accordance with some embodiments, the secondary rectifier 106 is formed by a synchronous switch $S_{SR}$. The synchronous switch $S_{SR}$ may be an n-type MOSFET device. It should be noted that the synchronous rectifier may be formed by other switching elements such as BJT devices, SJT devices, IGBT devices and the like. It should further be noted that while FIG. 2 illustrates a single switching element for the synchronous switch $S_{SR}$, one of ordinary skill in the art would recognize many variations, alternatives, and modifications. For example, the synchronous switch $S_{SR}$ may comprise a plurality of MOSFET devices connected in parallel. Furthermore, the synchronous switch $S_{SR}$ may be replaced by a diode.

As shown in FIG. 2, the secondary side controller 114 may receive a plurality of signals such as the output voltage signal and the signal representing the voltage across the secondary winding $N_S$. Based upon the received signals, the secondary side controller 114 generates a gate drive signal $G_{SR}$ for driving the synchronous switch $S_{SR}$.

According to the operation principles of flyback converters, when the input voltage source VIN is applied to the primary side winding $N_p$ of the transformer T1 through the turn-on of the primary switch $S_M$, the polarity of the secondary side winding $N_s$ of the transformer T1 is so configured that the synchronous switch $S_{SR}$ is turned off and the load (not shown) connected to the flyback converter is supplied by the energy stored in the output capacitor $C_0$. On the other hand, when the primary side switch $S_M$ is turned off and the synchronous switch $S_{SR}$ is turned on, the energy stored in the transformer is transferred to the load through the turned-on synchronous switch $S_{SR}$. The detailed operation of the secondary side of the flyback converter is well known in the art, and hence is not discussed in further detail herein.

Figure 3:
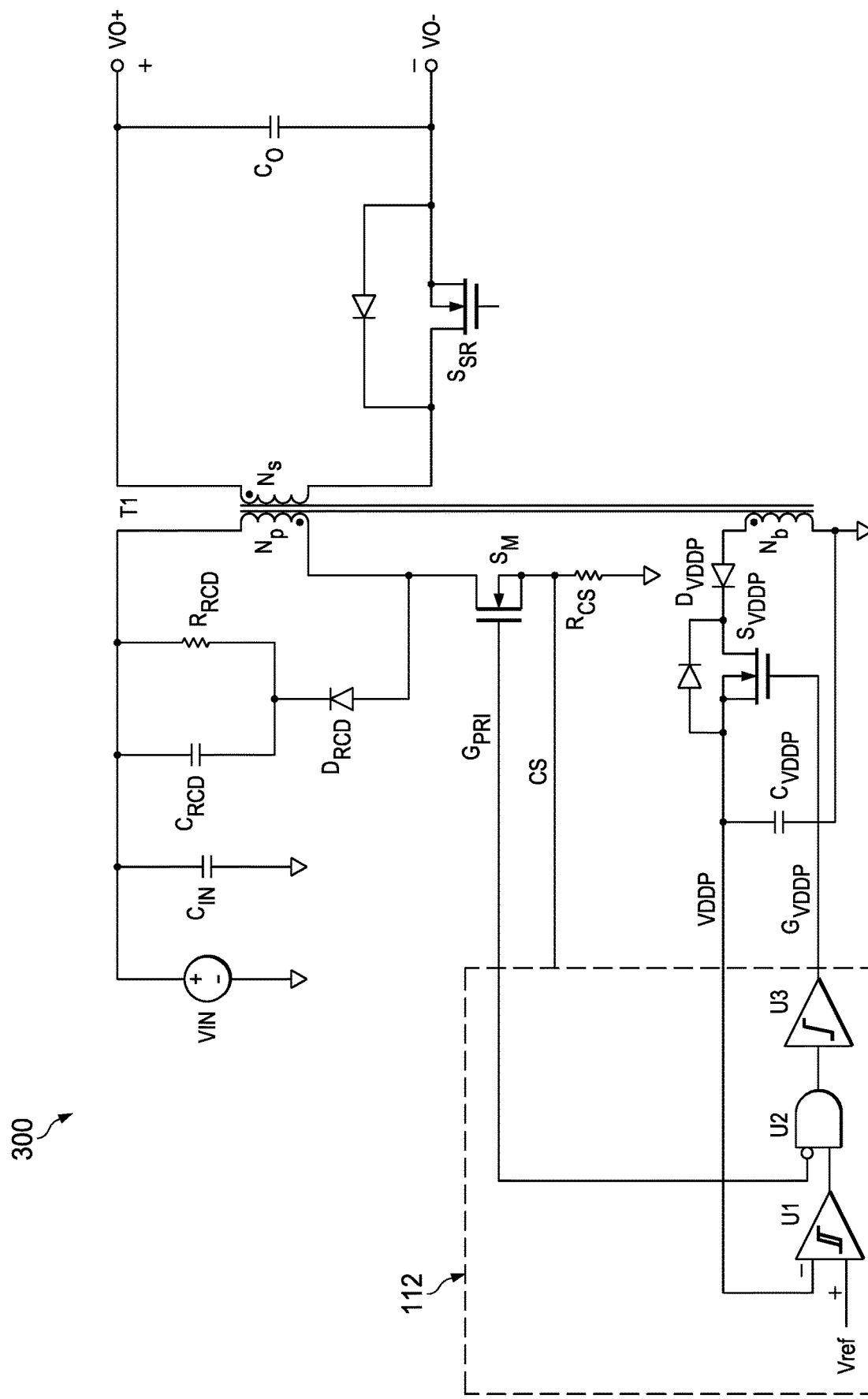
FIG. 3 illustrates a schematic diagram of a first implementation of a primary side bias power supply of a flyback converter in accordance with various embodiments of the present disclosure.

FIG. 3 illustrates a schematic diagram of a first implementation of a primary side bias power supply of a flyback converter in accordance with various embodiments of the present disclosure. The flyback converter 300 shown in FIG. 3 is similar to the flyback converter 200 shown in FIG. 2. In FIG. 3, like reference numerals refer to like elements. As such, descriptions on the like elements are not repeated. Furthermore, the primary side controller 112 may comprise various function units. For simplicity, only relevant portions (e.g., the control circuit of the bias power supply) are illustrated in FIG. 3.

As shown in FIG. 3, the primary bias power supply comprises a bias power converter portion and a control circuit portion. The bias power converter portion includes a bias winding $N_b$, a diode $D_{VDDP}$, a switch $S_{VDDP}$ and a capacitor $C_{VDDP}$. Throughout the description, the switch $S_{VDDP}$ is alternatively referred to as a bias switch and the capacitor $C_{VDDP}$ is alternatively referred to as a bias capacitor. The bias winding $N_b$ is magnetically coupled to the transformer T1. The structure and operating principle of the bias winding are well known, and hence are not discussed herein.

As shown in FIG. 3, the diode $D_{VDDP}$ and the switch $S_{VDDP}$ are connected in series between the bias winding $N_b$ and the capacitor $C_{VDDP}$. The diode $D_{VDDP}$ functions as a blocking diode. Throughout the description, the diode $D_{VDDP}$ is alternatively referred to as a blocking diode. In some embodiments, when the voltage across the bias winding $N_b$ is lower than the voltage across the capacitor $C_{VDDP}$, the diode $D_{VDDP}$ prevents the capacitor $C_{VDDP}$ from being discharged.

The switch $S_{VDDP}$ is employed to control the charge of the capacitor $C_{VDDP}$. In particular, the capacitor $C_{VDDP}$ is charged only when it is necessary. For example, when the bias voltage VDDP is lower than a first predetermined threshold, the switch $S_{VDDP}$ is turned on and the capacitor $C_{VDDP}$ is charged by the bias winding $N_b$ through the diode $D_{VDDP}$ and the turned-on switch $S_{VDDP}$. Once the bias voltage VDDP reaches a second predetermined threshold, the switch $S_{VDDP}$ is turned off accordingly. In some embodiments, the second predetermined threshold is greater than the first predetermined threshold.

The control circuit portion includes a comparator U1, a logic gate U2 and a level shifter U3. The non-inverting input of the comparator U1 is connected to a predetermined reference Vref. The inverting input of the comparator U1 is configured to receive the bias voltage VDDP.

The logic gate U2 is an AND gate. A first input of the logic gate U2 is connected to the output of the comparator U1. A second input of the logic gate U2 is configured to receive the primary switch's gate drive signal through an inverter. The circle placed at the second input of the logic gate U2 indicates the signal applied to the second input of the logic gate U2 is a signal inverted from $G_{PRI}$. In other words, the signal applied to the second input of the logic gate U2 and the primary switch's gate drive signal $G_{PRI}$ are two complementary signals.

In operation, when the primary switch $S_M$ is turned on, the signal applied to the second input of the logic gate U2 is a logic low signal. Such a logic low signal overrides the signal from the comparator U1, leaving the output of the logic gate U2 at a logic level of 0. As a result, the bias switch $S_{VDDP}$ is turned off. According to the logic circuit configuration shown in FIG. 3, the switch $S_{VDDP}$ can be turned on after the primary switch $S_M$ is turned off and the bias voltage VDDP is lower than the predetermined reference Vref.

It should be noted that the comparator U1 is a hysteretic comparator. The predetermined reference Vref includes a low threshold and a high threshold. When the bias voltage drops below the low threshold, the bias switch $S_{VDDP}$ is turned on and the magnetizing current from the bias winding $N_b$ charges the bias capacitor $C_{VDDP}$. The bias switch $S_{VDDP}$ remains on until the bias voltage VDDP reaches the high threshold. The detailed operation principle of the hysteretic comparator will be described below with respect to FIG. 4.

It should further be noted that while FIG. 3 illustrates the voltage of the bias power supply is regulated through a hysteresis control mechanism, other suitable control mechanisms may be employed to regulate the bias voltage. For example, a constant off time control mechanism, a constant on time control mechanism and/or a pulse-width modulation (PWM) control mechanism may be alternatively employed to regulate the bias voltage VDDP.

As shown in FIG. 3, the source of the bias switch $S_{VDDP}$ is not connected to ground. In fact, the source of the bias switch $S_{VDDP}$ is connected to the capacitor $C_{VDDP}$. In order to drive the bias switch $S_{VDDP}$, the gate drive signal has to be level-shifted from the level of ground to the level of VDDP. The level shifter U3 is employed to fulfill this function. The structure and operating principle of the level shifter are well known, and hence are not discussed herein.

One advantageous feature of having the bias power supply shown in FIG. 3 is the bias power supply can maintain the bias voltage through a hysteresis control method. As a result, the bias power supply does not require a linear regulator for regulating the bias voltage VDDP. The bias power supply without having a linear regulator can reduce unnecessary power losses, thereby achieving better efficiency.

Figure 4:
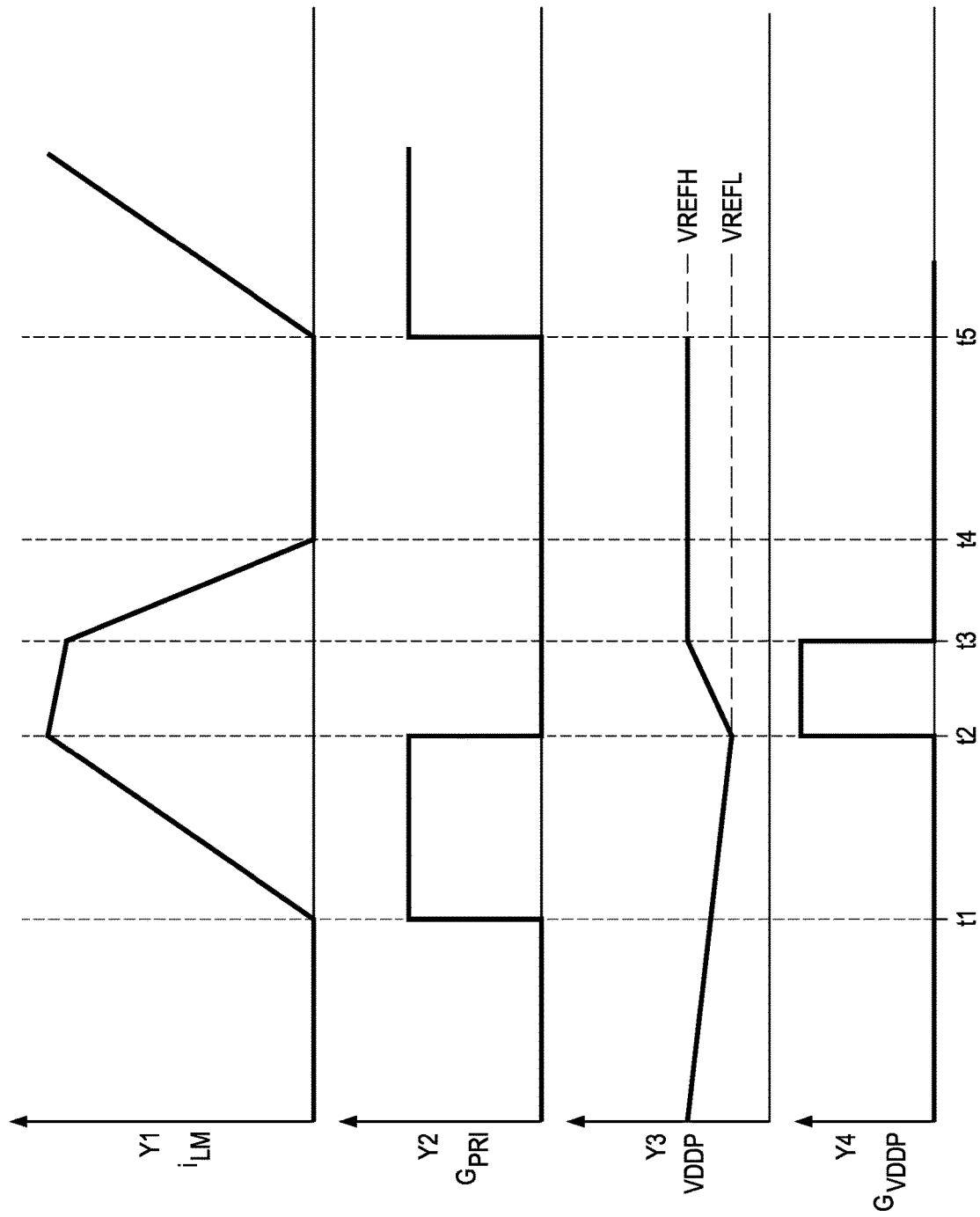
FIG. 4 illustrates an embodiment timing diagram of controlling the bias power supply shown in FIG. 3 in accordance with various embodiments of the present disclosure.

FIG. 4 illustrates an embodiment timing diagram of controlling the bias power supply shown in FIG. 3 in accordance with various embodiments of the present disclosure. The horizontal axis of FIG. 4 represents intervals of time. There are four vertical axes. The first vertical axis Y1 represents the magnetizing current flowing through the primary side of the transformer T1. The second vertical axis Y2 represents the gate drive signal of the primary side switch. The third vertical axis Y3 represents the bias voltage VDDP. The fourth vertical axis Y4 represents the gate drive signal of the bias switch.

At time t1, the primary side switch $S_M$ is turned on. As a result of turning on the primary side switch $S_M$, the magnetizing current ramps up from time t1 until time 2 when the primary side switch $S_M$ is turned off. From time t1 to time t2, the bias voltage VDDP drops as shown in FIG. 4. According to the control logic described above with respect to FIG. 3, the bias switch $S_{VDDP}$ of the bias power supply cannot be turned on until the primary side switch $S_M$ is off. As such, the gate drive signal $G_{VDDP}$ of the bias switch $S_{VDDP}$ is low from time t1 to time t2.

The comparator U1 shown in FIG. 3 has a hysteresis band. In other words, the reference of the comparator U1 includes an upper threshold VREFH and a lower threshold VREFL. In operation, when the bias voltage VDDP drops below the lower threshold VREFL, the output of the comparator U1 transitions from a logic low state to a logic high state. The output of the comparator U1 maintains the logic high state until the bias voltage VDDP reaches the upper threshold VREFH. After the bias voltage reaches the upper threshold VREFH, the output of the comparator U1 transitions from a logic high state to a logic low state.

At time t2, the bias voltage drops below the lower threshold VREFL and the primary side switch $S_M$ is turned off, the bias switch $S_{VDDP}$ is turned on as indicated by the gate drive signal $G_{VDDP}$. In response to the turned-on bias switch $S_{VDDP}$, the magnetizing current from the bias winding $N_b$ starts to charge the bias capacitor $C_{VDDP}$ and the bias voltage VDDP increases in a linear manner as shown in FIG. 4.

At time t3, the bias voltage reaches the upper threshold VREFH, the output of the comparator U1 transitions from a logic high state to a logic low state. In response to this logic state change, the bias switch $S_{VDDP}$ is turned off at time t3 as indicated by the gate drive signal $G_{VDDP}$. During the time interval from t2 to t3, the magnetizing current is partially reset by the bias voltage VDDP. The magnetizing current is of a slope of $-VDDP/L_M$, where $L_M$ is the magnetizing inductance of the transformer T1.

During the time interval from t3 to t4, the magnetizing current is reset by the RCD reset device. The magnetizing current $i_{LM}$ decreases in a linear manner as shown in FIG. 4. From t3 to t4, the magnetizing current is of a slope of $-V_C/L_M$, where $V_C$ is the voltage across the capacitor $C_{RCD}$. At t4, the magnetizing current is reset to zero. At time t5, a new switching cycle starts and the magnetizing current $i_{LM}$ starts to increase after the primary switch $S_M$ has been turned on.

In order to have the magnetizing current timing sequence (from t2 to t4) shown in FIG. 4, the bias voltage VDDP should be less than or equal to the lower end of the output voltage of the flyback converter 300. In operation, when the primary switch $S_M$ is turned on, the magnetizing current ramps up and the energy is stored in the transformer T1 in the time interval from t1 to t2. After the primary switch $S_M$ has been turned off, the magnetizing current is diverted to the lower voltage potential first. Since the bias voltage VDDP is less than or equal to the lower end of the output voltage of the flyback converter 300, the magnetizing current charges the bias capacitor first in the time interval from t2 to t3, and then the magnetizing current charges the output capacitor of the flyback converter 300 during the time interval from t3 to t4.

FIG. 4 illustrates the magnetizing current $i_{LM}$ includes a ramp up phase (e.g., the time interval from t1 to t2) and a ramp down phase (e.g., the time interval from t2 to t4). The charge of the bias capacitor $C_{VDDP}$ occurs during the ramp down phase as shown in FIG. 4. It should be noted, in some embodiments, the charge of the bias capacitor $C_{VDDP}$ may occur during the ramp up phase of the magnetizing current $i_{LM}$. An example of charging the bias capacitor $C_{VDDP}$ during the ramp up phase of the magnetizing current $i_{LM}$ will be described below with respect to FIG. 7.

Figure 5:
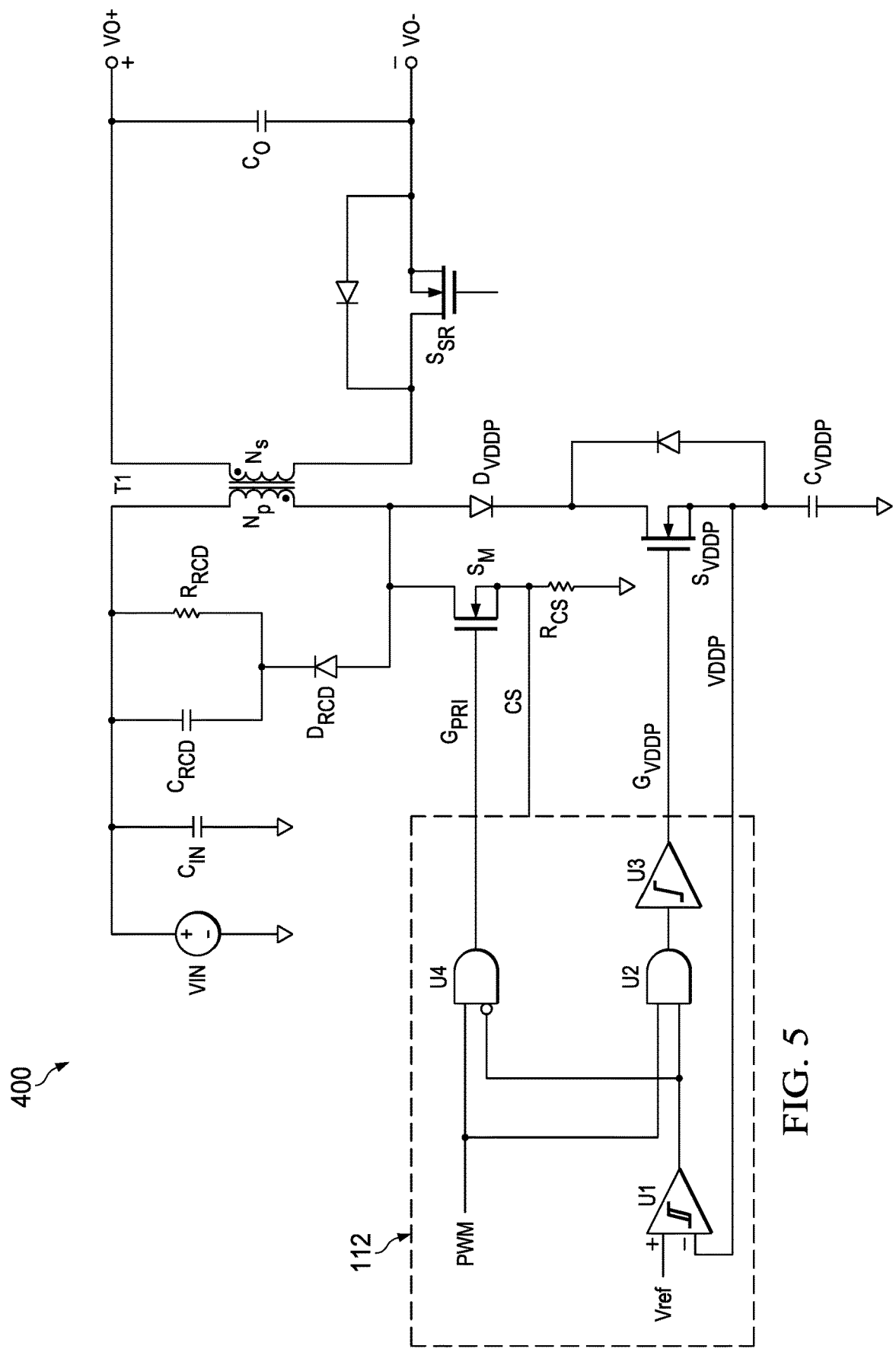
FIG. 5 illustrates a schematic diagram of a second implementation of a primary side bias power supply of a flyback converter in accordance with various embodiments of the present disclosure.

FIG. 5 illustrates a schematic diagram of a second implementation of a primary side bias power supply of a flyback converter in accordance with various embodiments of the present disclosure. The flyback converter 400 shown in FIG. 4 is similar to the flyback converter 300 shown in FIG. 3. In FIG. 4, like reference numerals refer to like elements. As such, descriptions on the like elements are not repeated.

As shown in FIG. 5, the primary bias power supply comprises a bias power converter portion and a control circuit portion. The bias power converter portion includes a diode $D_{VDDP}$, a switch $S_{VDDP}$ and a capacitor $C_{VDDP}$. As shown in FIG. 5, the diode $D_{VDDP}$ and the switch $S_{VDDP}$ are connected in series between the primary winding $N_P$ and the capacitor $C_{VDDP}$. The diode $D_{VDDP}$ functions as a blocking diode. For example, when the primary switch $S_M$ is turned on, the diode $D_{VDDP}$ helps to prevent the capacitor $C_{VDDP}$ from being discharged through the turned-on primary switch $S_M$.

The switch $S_{VDDP}$ is employed to control the charge of the capacitor $C_{VDDP}$. In particular, the capacitor $C_{VDDP}$ is charged only when it is necessary. For example, when the bias voltage VDDP is lower than a predetermined reference Vref, the switch $S_{VDDP}$ is turned on and the capacitor $C_{VDDP}$ is charged by the magnetizing current through the diode $D_{VDDP}$ and the turned-on switch $S_{VDDP}$. Once the bias voltage VDDP is above the predetermined reference Vref, the switch $S_{VDDP}$ is turned off accordingly.

The control circuit portion includes a comparator U1, a first logic gate U2 and a level shifter U3 and a second logic gate U4. In some embodiments, the comparator U1 is a hysteretic comparator. Both the first logic gate U2 and the second logic gate U4 are AND gates. The non-inverting input of the comparator U1 is connected to the predetermined reference Vref. The inverting input of the comparator U1 is configured to receive the bias voltage VDDP.

A first input of the first logic gate U2 is connected to the output of the comparator U1. A second input of the first logic gate U2 is configured to receive a PWM signal generated by the primary side controller 112.

A first input of the second logic gate U4 is connected to the output of the comparator U1 through an inverter. The circle placed at the first input of the second logic gate U4 indicates the signal applied to the first input of the second logic gate U4 is a signal inverted from the signal generated by the comparator U1. A second input of the second logic gate U4 is configured to receive the PWM signal generated by the primary side controller 112.

In operation, the PWM signal generated by the primary side controller 112 is applied to both the primary switch $S_M$ and the bias switch $S_{VDDP}$. If the bias voltage VDDP is lower than a predetermined reference Vref, the comparator U1 generates a logic high state. After passing through an inverter (the circle attached to the second logic gate U4), the signal applied to the first input of the second logic gate U4 is a logic low signal. Such a logic low signal overrides the PWM signal applied to the second logic gate U4, leaving the output of the second logic gate U4 at a logic low state. As a result, despite that the PWM signal is applied to both switches, the control circuit turns on the bias switch $S_{VDDP}$ before turning on the primary switch $S_M$ when charging the bias capacitor $C_{VDDP}$ is necessary. The primary switch $S_M$ remains off until the bias switch $S_{VDDP}$ has been turned off. The detailed timing diagram of controlling the bias power supply shown in FIG. 5 will be discussed below with respect to FIG. 7.

One advantageous feature of having the bias power supply shown in FIG. 5 is the bias power supply can be charged by the primary winding $N_P$ of the flyback converter 400. As a result, the bias power supply does not require a bias winding for charging the bias capacitor $C_{VDDP}$. The bias power supply without having a dedicated bias winding can simplify the design of the transformer T1, thereby improving the reliability and cost of the flyback converter 400.

Figure 6:
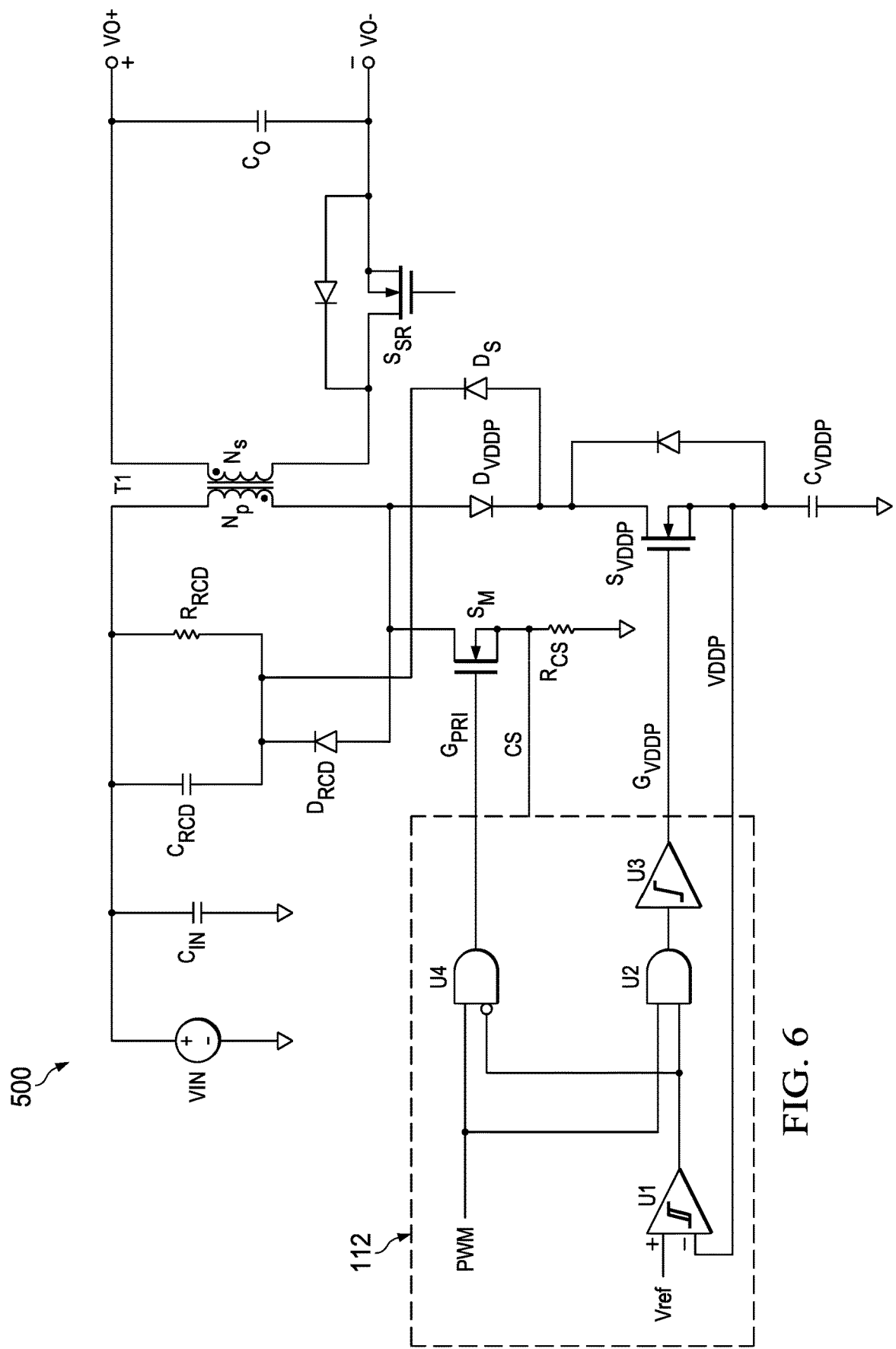
FIG. 6 illustrates a schematic diagram of a third implementation of a primary side bias power supply of a flyback converter in accordance with various embodiments of the present disclosure.

FIG. 6 illustrates a schematic diagram of a third implementation of a primary side bias power supply of a flyback converter in accordance with various embodiments of the present disclosure. The flyback converter 500 is similar to the flyback converter 400 shown in FIG. 5 except that a diode $D_S$ is connected between the common node of the drain of the bias switch $S_{VDDP}$ and the diode $D_{VDDP}$, and the reset capacitor $C_{RCD}$. The diode $D_{VDDP}$ functions as a snubber to reduce the voltage stress on the bias switch $S_{VDDP}$.

The snubber shown in FIG. 6 can help to reduce the ringing across the bias switch $S_{VDDP}$. It should be noted that the snubber shown in FIG. 6 is applicable to all other bias power supplies in the present disclosure.

Figure 7:
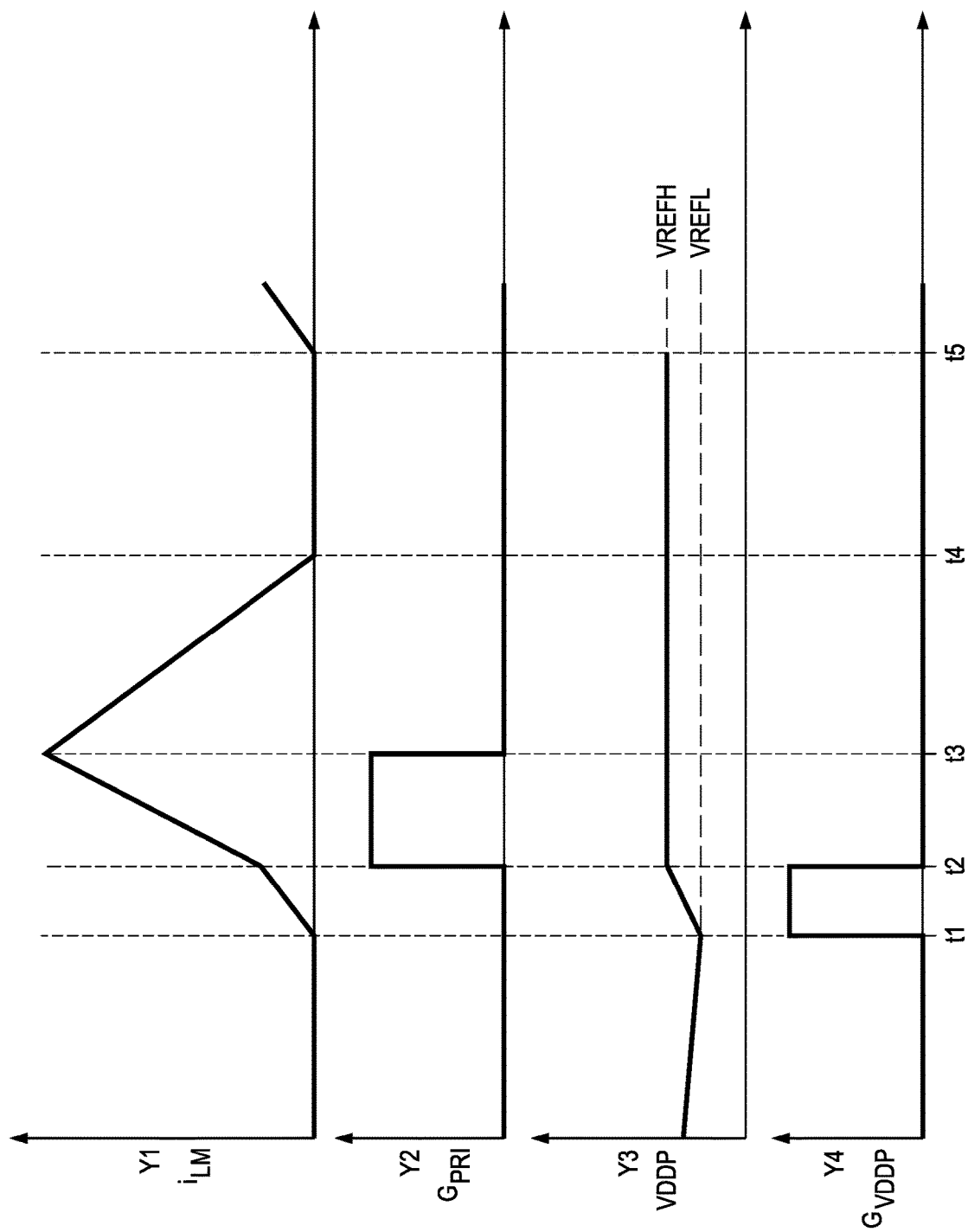
FIG. 7 illustrates an embodiment timing diagram of controlling the bias power supply shown in FIG. 5 in accordance with various embodiments of the present disclosure.

FIG. 7 illustrates an embodiment timing diagram of controlling the bias power supply shown in FIG. 5 in accordance with various embodiments of the present disclosure. The horizontal axis of FIG. 7 represents intervals of time. There are four vertical axes. The first vertical axis Y1 represents the magnetizing current flowing through the primary side of the transformer T1. The second vertical axis Y2 represents the gate drive signal of the primary side switch $S_M$. The third vertical axis Y3 represents the bias voltage VDDP. The fourth vertical axis Y4 represents the gate drive signal of the bias switch of the bias power supply.

At time t1, after the bias voltage reaches the lower threshold VREFL, the output of the comparator U1 transitions from a logic low state to a logic high state. At the same time, the PWM signal is applied to both the primary switch $S_M$ and the bias switch $S_{VDDP}$. Both the PWM signal and the output of the comparator U1 have a logic high state. As a result, the first logic gate U2 generates a logic high signal, which is used to turn on the bias switch $S_{VDDP}$ through the level shifter U3. As shown in FIG. 7, from t1 to t2, the bias switch gate drive signal $G_{VDDP}$ is of a logic high state.

In response to the turned-on bias switch $S_{VDDP}$, the magnetizing current of the transformer T1 charges the bias capacitor $C_{VDDP}$ in a linear manner from t1 to t2. During the time interval from t1 to t2, the magnetizing current is of a slope of (VIN−VDDP)/$L_M$, where $L_M$ is the magnetizing inductance of the transformer T1. During the time interval from t1 to t2, the primary switch $S_M$ remains off as shown in FIG. 7.

At time t2, after the bias voltage VDDP reaches VREFH, the output of the comparator U1 transitions from a logic high state to a logic low state. In response to this logic state change, the bias switch $S_{VDDP}$ is turned off and the primary side switch $S_M$ is turned on. As a result of turning on the primary side switch $S_M$, the magnetizing current ramps up from t2 to t3 until the primary side switch $S_M$ is turned off. During the time interval from t2 to t3, the magnetizing current is of a slope of $VIN/L_M$. During the time interval from t3 to t5, the timing diagram of FIG. 7 is similar to that shown in FIG. 4, and hence is not discussed in detail to avoid unnecessary repetition.

It should be noted FIG. 7 shows a timing diagram of controlling the bias power supply of a power converter having a RCD reset device. In some applications, the power converter may have an active clamp reset device, and the magnetizing current may go negative. In these applications having an active clamp reset device, before turning on the bias switch $S_{VDDP}$, the body diode of the main switch $S_M$ may conduct in response to the negative magnetizing current. In some embodiments, the main switch $S_M$ may be turned on to conduct the negative magnetizing current until the magnetizing current is reset to a value approximately equal to zero. After that, the bias switch $S_{VDDP}$ is turned on and the magnetizing current is diverted to charge the bias capacitor $C_{VDDP}$. In order to control the turn-on time of the bias switch $S_{VDDP}$, a zero current crossing detector may be used to detect the magnetizing current and determine the turn-on time of the bias switch $S_{VDDP}$ accordingly.

Figure 8:
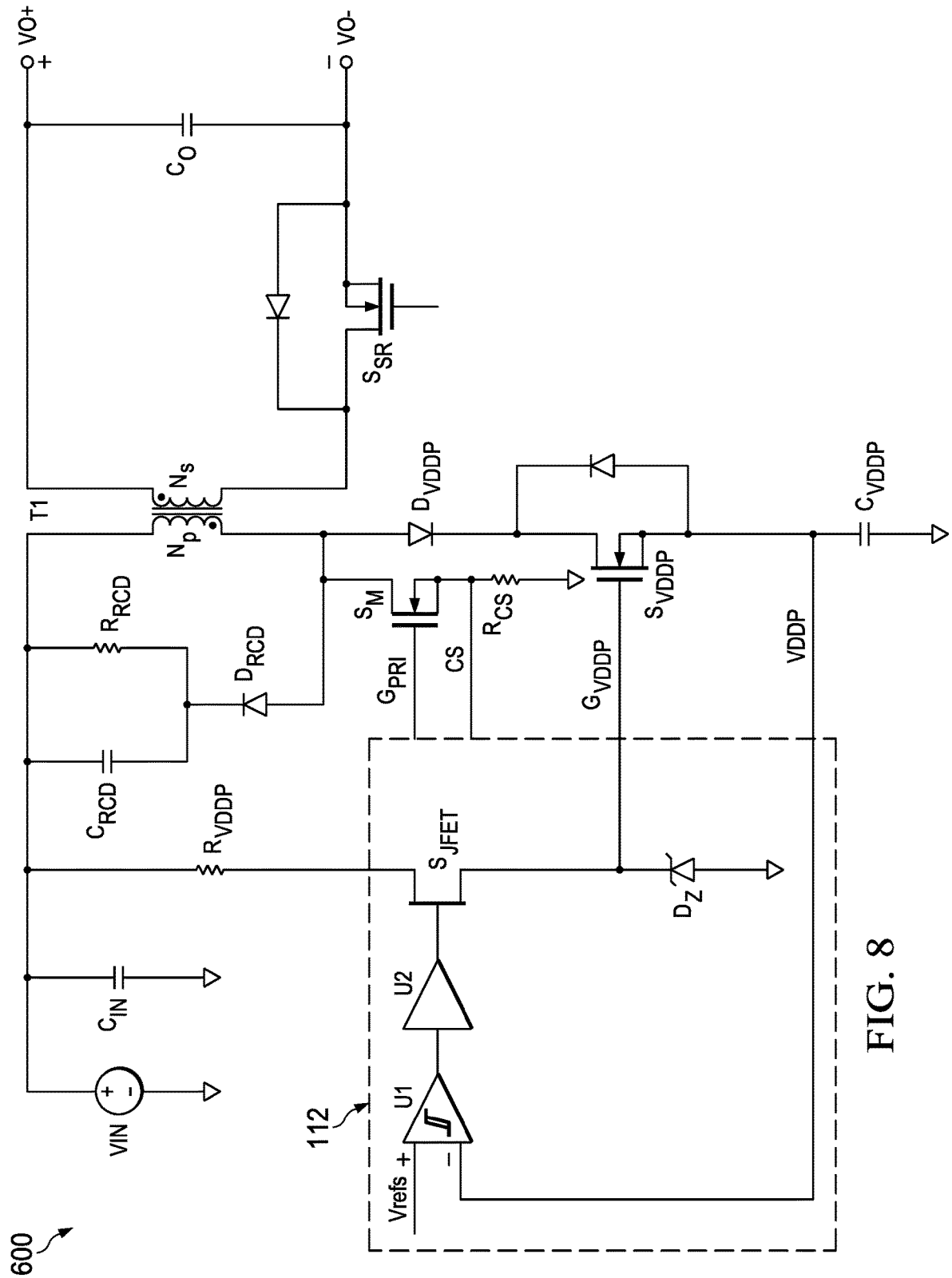
FIG. 8 illustrates a schematic diagram of a fourth implementation of a primary side bias power supply of a flyback converter in accordance with various embodiments of the present disclosure.

FIG. 8 illustrates a schematic diagram of a fourth implementation of a primary side bias power supply of a flyback converter in accordance with various embodiments of the present disclosure. The flyback converter 600 is similar to the flyback converter 400 shown in FIG. 5 except that a depletion mode junction gate field-effect transistor (JFET) has been used as a high voltage startup circuit.

In operation, when the bias voltage VDDP is greater than the predetermined reference Vrefs, the comparator U1 generates a logic low signal. Such a logic low signal pulls the gate of the JFET $S_{JFET}$ to ground through the buffer U2. As a result of pulling the gate to ground, the gate-source voltage of the JFET $S_{JFET}$ is a negative voltage, thereby turning off the JFET $S_{JFET}$.

During a startup process of the flyback converter 600, the gate-source voltage of the JFET $S_{JFET}$ is approximately equal to zero. According to the operating principle of depletion mode JFET transistors, the JFET $S_{JFET}$ is on and the input voltage VIN is applied to the gate of the bias switch $S_{VDDP}$ through the resistor $R_{VDDDP}$ and the turned-on JFET $S_{JFET}$. The gate voltage of the bias switch $S_{VDDP}$ is clamped by the Zener diode $D_Z$. In some embodiments, the Zener diode $D_Z$ clamps the gate voltage of the bias switch $S_{VDDP}$ to a level approximately equal to two times the bias voltage VDDP.

One advantageous feature of having the bias power supply shown in FIG. 8 is that the bias switch $S_{VDDP}$ can be used to provide a conductive path for charging the bias capacitor before the main switch $S_M$ starts switching during a startup process of the flyback converter 600. As a result, the flyback converter 60 does not require a dedicated startup switch.

It should be noted the JFET $S_{JFET}$ and its control circuit (e.g., U1 and U2) can be removed so as to simplify the design of the bias power supply. For example, the resistor $R_{VDDDP}$ may be connected to the Zener diode $D_Z$ directly to establish a voltage for driving the bias switch $S_{VDDP}$. This variation of the bias power supply is within the scope of the claims.

Figure 9:
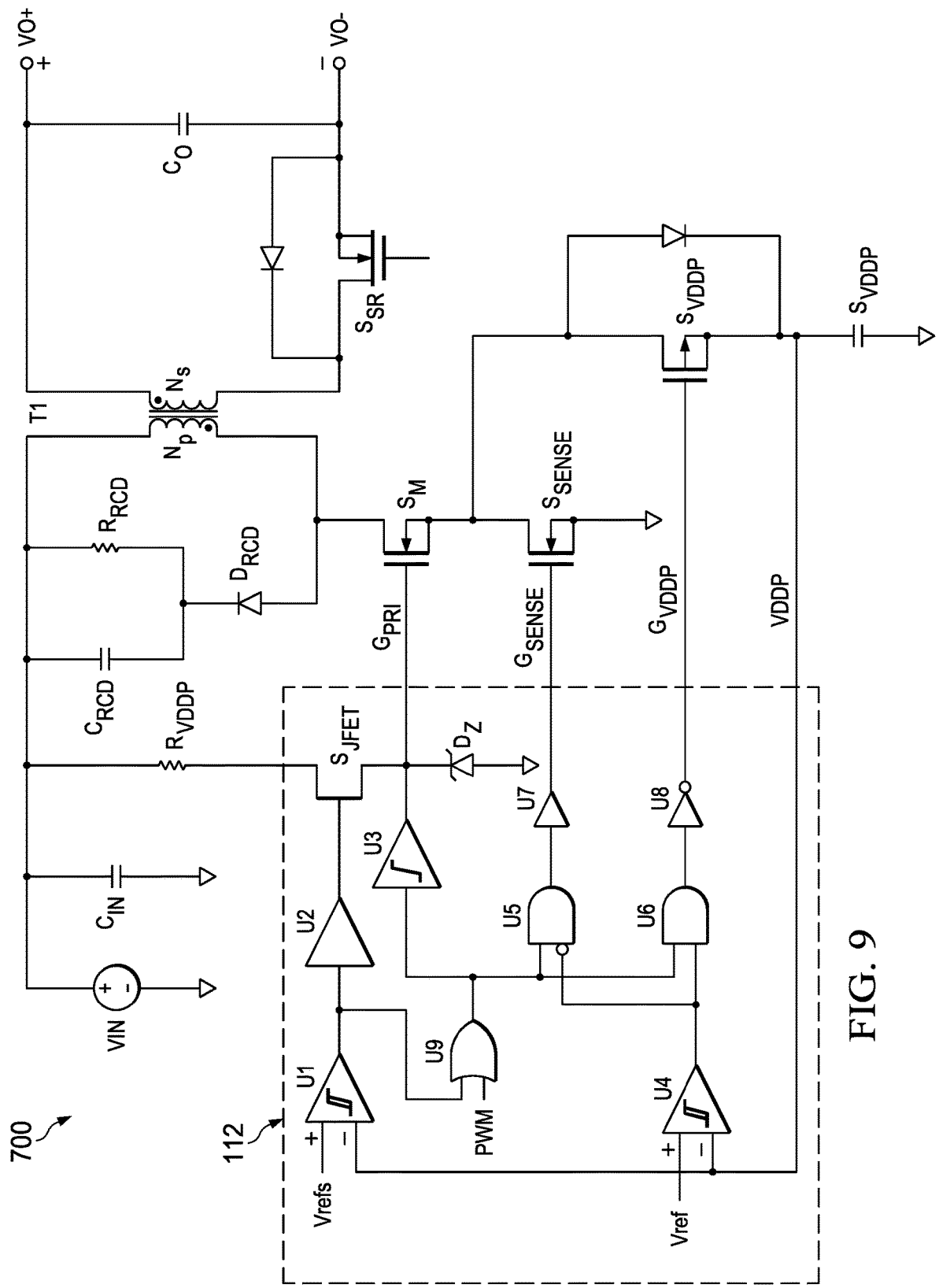
FIG. 9 illustrates a schematic diagram of a fifth implementation of a primary side bias power supply of a flyback converter in accordance with various embodiments of the present disclosure.

FIG. 9 illustrates a schematic diagram of a fifth implementation of a primary side bias power supply of a flyback converter in accordance with various embodiments of the present disclosure. The flyback converter 700 is similar to the flyback converter 600 shown in FIG. 8 except that the bias switch $S_{VDDP}$ is connected to a drain of a sense switch $S_{SENSE}$. In order to reduce the voltage stress on the bias switch $S_{VDDP}$, the bias switch $S_{VDDP}$ is connected to the source of the main switch $S_M$ as shown in FIG. 9. The sense switch $S_{SENSE}$ is employed to replace the sense resistor $R_{CS}$ shown in FIG. 8. As shown in FIG. 9, the sense switch $S_{SENSE}$ and the main switch $S_M$ are connected in series between the primary winding $N_p$ and ground. The bias switch $S_{VDDP}$ is a p-type MOSFET. The drain of the bias switch $S_{VDDP}$ is connected to the common node of the sense switch $S_{SENSE}$ and the main switch $S_M$. The source of the bias switch $S_{VDDP}$ is connected to the bias capacitor $C_{VDDP}$.

It should be noted that the system configuration shown in FIG. 9 does not require a blocking diode connected in series with the bias switch $S_{VDDP}$. By saving the blocking diode, the flyback converter 700 can further reduce power losses.

It should further be noted the bias switch $S_{VDDP}$ is implemented as a p-type MOSFET. This implementation is merely an example, which should not unduly limit the scope of the claims. One of ordinary skill in the art would recognize many variations, alternatives, and modifications. For example, the bias switch $S_{VDDP}$ is implemented as an n-type MOSFET. In order to drive the n-type MOSFET, the driver (e.g., U8) of the n-type MOSFET is a buffer rather than an inverter. Furthermore, the driver may include a level shifter because the source of the n-type MOSFET is not connected to ground.

The control circuit of the main switch $S_M$ includes a first comparator U1, a first buffer U2, a level shifter U3, a depletion mode JFET $S_{JFET}$, a Zener diode $D_Z$ and an OR gate U9. The control circuit portion of the bias power supply includes a second comparator U4, a first logic gate U5, a second logic gate U6, a second butter U7 and an inverter U8. As shown in FIG. 9, the first logic gate U5 is an AND gate. The second logic gate U6 is an AND gate.

During a startup process of the flyback converter 700, the depletion mode JFET $S_{JFET}$ is turned on because the initial voltage applied to the gate-source of the depletion mode JFET $S_{JFET}$ is approximately equal to zero. The input voltage VIN is applied to the gate of the main switch $S_M$ through the turned-on JFET $S_{JFET}$ and the resistor $R_{VDDDP}$. The gate voltage of the main switch $S_M$ is clamped by the Zener diode $D_Z$. In response to the voltage applied to the gate of the main switch $S_M$, the main switch $S_M$ is turned on.

During the startup process, the bias voltage VDDP is below the predetermined reference Vref. The second comparator U4 generates a logic high signal. The logic high signal becomes a logic low signal after passing the second logic gate U6 and the inverter U8. The logic low signal pulls down the gate of the bias switch $S_{VDDP}$, thereby turning on the bias switch $S_{VDDP}$. The magnetizing current of the transformer T1 starts to charge the bias capacitor $C_{VDDP}$ until the bias voltage VDDP reaches the predetermined reference Vref.

It should be noted the comparator U4 is a hysteretic comparator. The predetermined reference Vref includes two different voltage thresholds.

After the startup process of the flyback converter 700 finishes and the bias voltage has been established, the bias voltage VDDP is greater than a predetermined reference Vrefs. The first comparator U1 generates a logic low signal, which is able to turn off the depletion mode JFET $S_{JFET}$ to avoid unnecessary power losses.

In operation, the turn-on time of the bias switch $S_{VDDP}$ is in synchronization with the PWM signal. In particular, when the PWM signal has a logic low state, the comparison result from the second comparator U4 is overridden by the PWM signal at the second logic gate U6. On the other hand, when the PWM signal has a logic high state, the comparison result from the second comparator U4 can be applied to the bias switch $S_{VDDP}$ through the inverter U8. When the bias voltage VDDP is below the predetermined reference Vref and charging the bias capacitor $C_{VDDP}$ is necessary, the bias switch $S_{VDDP}$ is turned on. The detailed timing diagram of controlling the bias power supply shown in FIG. 9 will be discussed below with respect to FIG. 10.

It should be noted the JFET $S_{JFET}$ and its control circuit (e.g., U1 and U2) shown in FIG. 9 can be saved so as to simplify the design of the bias power supply. For example, the resistor $R_{VDDP}$ may be connected to the Zener diode $D_Z$ directly to establish a voltage for driving the main switch $S_M$ during a startup process. This variation of the bias power supply is within the scope of the claims.

Figure 10:
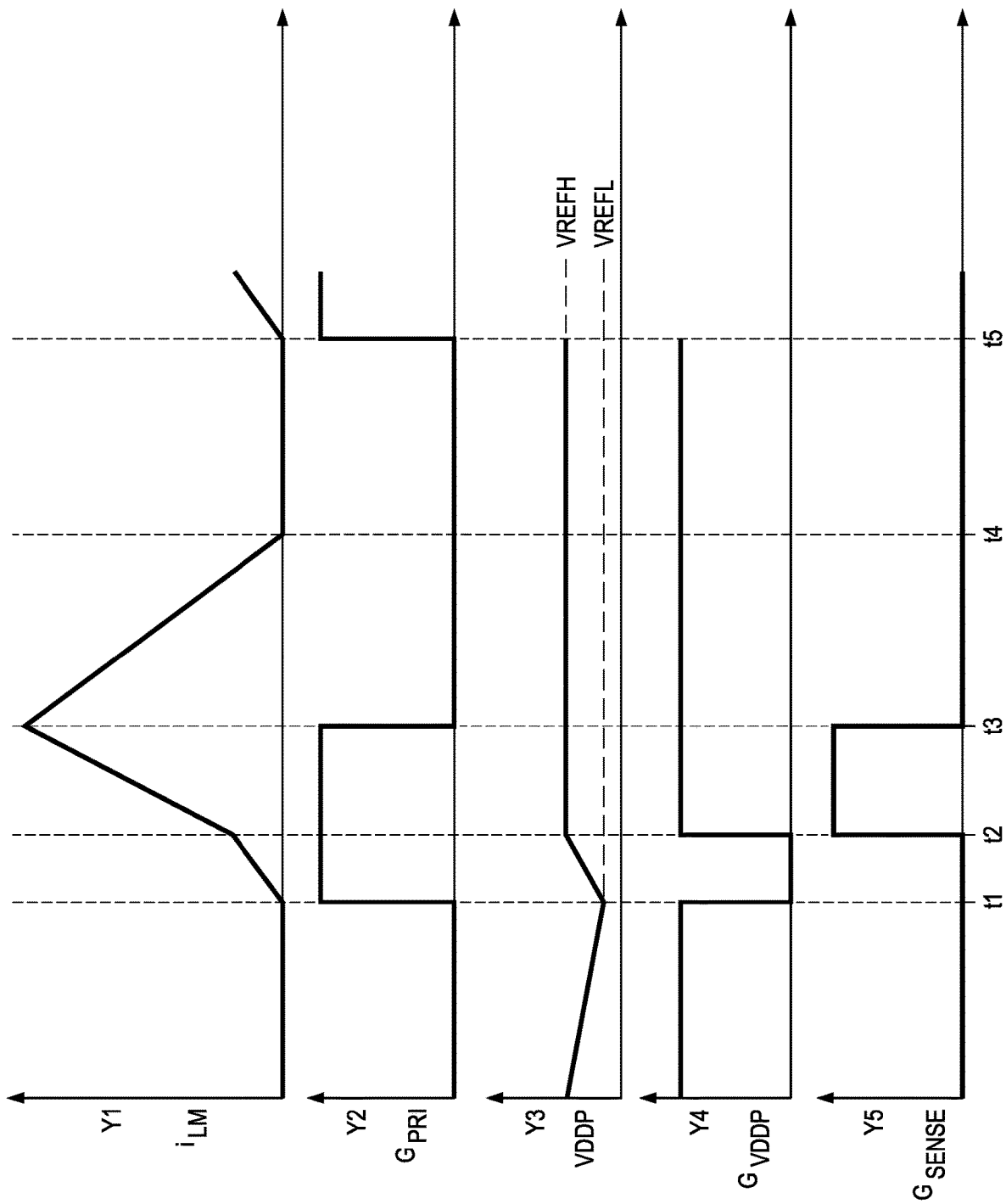
FIG. 10 illustrates an embodiment timing diagram of controlling the bias power supply shown in FIG. 9 in accordance with various embodiments of the present disclosure.

FIG. 10 illustrates an embodiment timing diagram of controlling the bias power supply shown in FIG. 9 in accordance with various embodiments of the present disclosure. The horizontal axis of FIG. 10 represents intervals of time. There are five vertical axes. The first vertical axis Y1 represents the magnetizing current flowing through the primary side of the transformer T1. The second vertical axis Y2 represents the gate drive signal of the primary side switch $S_M$. The third vertical axis Y3 represents the bias voltage VDDP. The fourth vertical axis Y4 represents the gate drive signal of the bias switch of the bias power supply. The fifth vertical axis Y5 represents the gate drive signal of the sense switch $S_{SENSE}$ of the bias power supply.

At time t1, after the bias voltage VDDP reaches the lower threshold VREFL, the output of the comparator U4 transitions from a logic low state to a logic high state. At the same time, the PWM signal is applied to the primary switch $S_M$, the current sense switch $S_{SENSE}$ and the bias switch $S_{VDDP}$. At time t, the primary switch $S_M$ is turned on. Since the output of the comparator U4 has a logic high state, the current sense switch $S_{SENSE}$ remains off from t1 to t2 because the signal applied to the current sense switch $S_{SENSE}$ is a logic low signal after the output signal of the comparator U4 passes through an inverter (the circle attached to the logic gate U5) as shown in FIG. 9.

Also at time t1, the output signal of the comparator U4 passes through the logic gate U6 and the inverter U8 and becomes a logic low signal. The bias switch $S_{VDDP}$, as a p-type MOSFET, is turned on by this logic low signal. The bias switch $S_{VDDP}$ remains on until t2 when the bias voltage VDDP reaches the high reference VREFH. During the time interval from t1 to t2, the magnetizing current is of a slope of (VIN−VDDP)/$L_M$, where $L_M$ is the magnetizing inductance of the transformer T1.

At time t2, the output of the comparator U4 transitions from a logic high state to a logic low state. In response to this logic change, the signal applied to the gate of the current sense switch $S_{SENSE}$ becomes a logic high signal, which turns on the current sense switch $S_{SENSE}$. During the time interval from t2 to t3, both the primary switch $S_M$ and the sense switch current sense switch $S_{SENSE}$ are turned on. The magnetizing current is of a slope of VIN/$L_M$. During the time interval from t3 to t5, the timing diagram in FIG. 10 is similar to that shown in FIG. 7, and hence is not discussed in detail to avoid unnecessary repetition.

Figure 11:
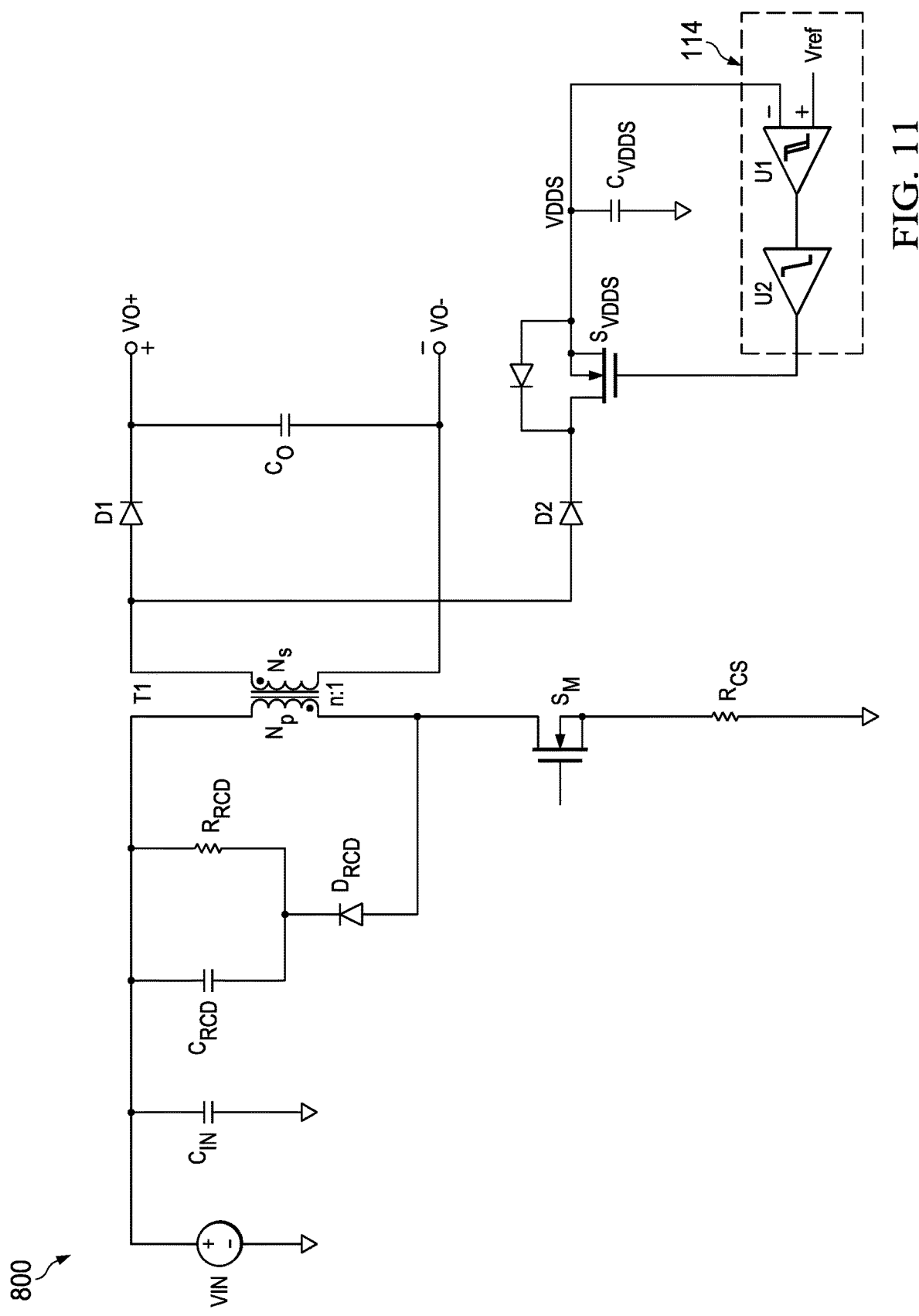
FIG. 11 illustrates a schematic diagram of a first implementation of a secondary side bias power supply of a flyback converter in accordance with various embodiments of the present disclosure.

FIG. 11 illustrates a schematic diagram of a first implementation of a secondary side bias power supply of a flyback converter in accordance with various embodiments of the present disclosure. The flyback converter 800 shown in FIG. 11 is similar to the flyback converter 200 shown in FIG. 2 except that the secondary switch is replaced by a diode D1. In FIG. 11, like reference numerals refer to like elements. As such, descriptions on the like elements are not repeated. Furthermore, the secondary side controller 114 may comprise various function units. For simplicity, only relevant portions (e.g., the control circuit of the secondary side bias power supply) are illustrated in FIG. 11.

As shown in FIG. 11, the second bias power supply comprises a bias power converter portion and a control circuit portion. The bias power converter portion includes a diode D2, a switch $S_{VDDS}$ and a capacitor $C_{VDDS}$. As shown in FIG. 11, the switch $S_{VDDS}$ is implemented as an n-type MOSFET. As shown in FIG. 11, the diode D2 and the switch $S_{VDDS}$ are connected in series between the secondary winding $N_s$ and the capacitor $C_{VDDS}$. The diode D2 functions as a blocking diode. When the voltage at the bias winding $N_s$ is lower than the voltage across the capacitor $C_{VDDS}$, the diode D2 prevents the capacitor $C_{VDDS}$ from being discharged.

The switch $S_{VDDS}$ is employed to control the charge of the capacitor $C_{VDDS}$. In particular, the capacitor $C_{VDDS}$ is charged only when it is necessary. For example, when the bias voltage VDDS is lower than a predetermined reference Vref, the switch $S_{VDDS}$ is turned on. The magnetizing current from the secondary winding $N_s$ is diverted to charge the capacitor $C_{VDDS}$ through a conductive path formed by the diode D2 and the turned-on switch $S_{VDDS}$. Once the bias voltage VDDS is above the predetermined reference Vref, the switch $S_{VDDS}$ is turned off accordingly.

The control circuit portion includes a comparator U1 and a level shifter U2. The non-inverting input of the comparator U1 is connected to the predetermined reference Vref. The inverting input of the comparator U1 is configured to receive the bias voltage VDDS. It should be noted the comparator U1 is a hysteretic comparator. The predetermined reference Vref includes two different voltage thresholds.

As shown in FIG. 11, the source of the switch $S_{VDDS}$ is not connected to ground. In fact, the source of the switch $S_{VDDS}$ is connected to the capacitor $C_{VDDS}$. In order to drive the switch $S_{VDDS}$, the gate drive signal has to be level-shifted from the level of ground to the level of VDDS. The level shifter U2 is employed to fulfill this function. The structure and operating principle of the level shifter are well known, and hence are not discussed herein.

It should be noted the bias supply shown in FIG. 11 is applicable to the power converters having an output voltage VO greater than the bias voltage VDDS. In the event when the bias voltage VDDS is greater than the output voltage of a power converter, a separate charge pump may be necessary. The separate charge pump may be connected to the drain of the bias switch $S_{VDDS}$ through one additional diode.

Figure 12:
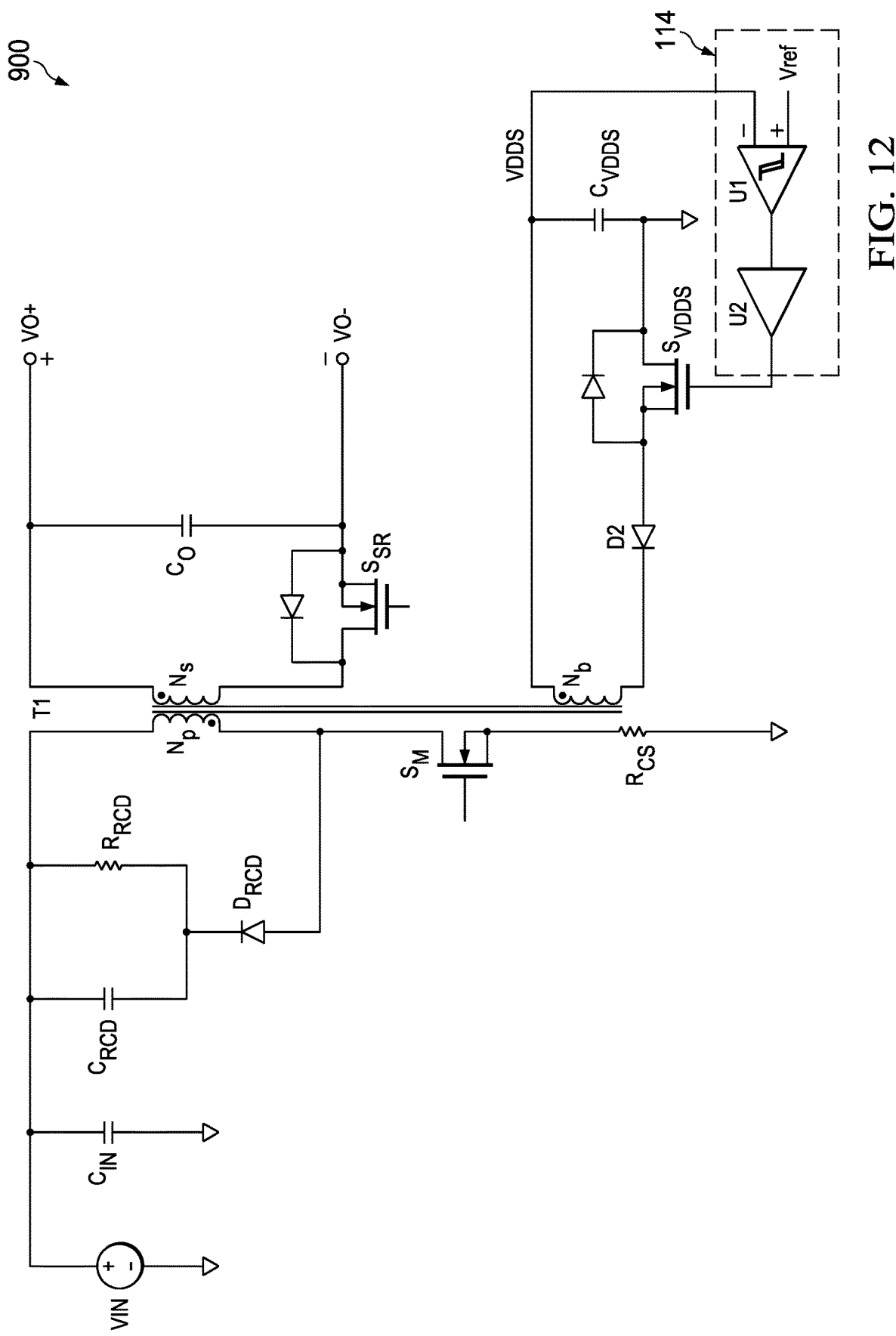
FIG. 12 illustrates a schematic diagram of a second implementation of a secondary side bias power supply of a flyback converter in accordance with various embodiments of the present disclosure.

FIG. 12 illustrates a schematic diagram of a second implementation of a secondary side bias power supply of a flyback converter in accordance with various embodiments of the present disclosure. The flyback converter 900 shown in FIG. 12 is similar to the flyback converter 800 shown in FIG. 11 except the secondary diode is replaced by a synchronous switch $S_{SR}$ and a bias winding $N_b$ is employed to charge the bias capacitor $C_{VDDS}$. The bias capacitor $C_{VDDS}$ is charged only when the bias voltage VDDS is lower than the predetermined reference voltage Vref. The bias winding charges the bias capacitor $C_{VDDS}$ through a conductive path formed by the bias switch $S_{VDDS}$ and the diode D2 after the primary switch $S_M$ has been turned off. The detailed operation principle of the bias power supply shown in FIG. 12 is similar to that of the bias power supply shown in FIG. 11, and hence is not discussed in further detail herein.

It should be noted in FIGS. 11 and 12, the bias voltage VDDS should be less than or equal to the lower end of the output voltage of the flyback converter. As discussed above with respect to FIG. 4, the magnetizing current of the transformer T1 can charge the bias capacitor $C_{VDDS}$ first, and then charges the output capacitor of the flyback converter if bias voltage VDDS is less than or equal to the lower end of the output voltage of the flyback converter.

Figure 13:
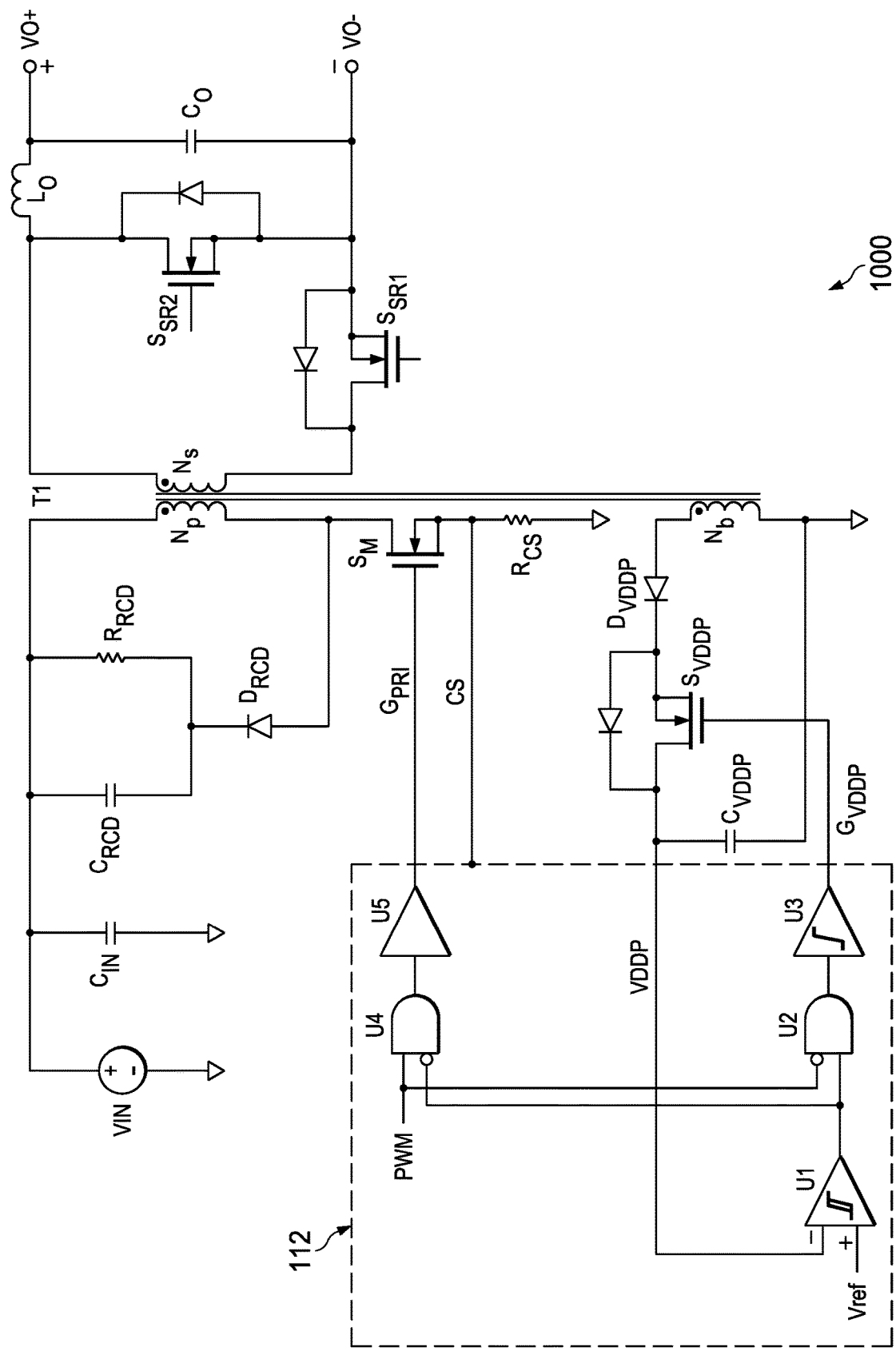
FIG. 13 illustrates a schematic diagram of an implementation of a primary side bias power supply of a forward converter in accordance with various embodiments of the present disclosure.

FIG. 13 illustrates a schematic diagram of an implementation of a primary side bias power supply of a forward converter in accordance with various embodiments of the present disclosure. The forward converter 1000 is a converter employing a RCD reset device formed by capacitor $C_{RCD}$, resistor $R_{RCD}$ and diode $D_{RCD}$ as shown in FIG. 13. The operating principle and the structure of RCD forward converters are well known, and hence are not discussed herein to avoid repetition.

The secondary side of the forward converter 100 comprises a synchronous rectifier and an output filter. The synchronous rectifier comprises a first switch $S_{SCR1}$ and a second switch $S_{CR2}$. The output filter comprises an output inductor Lo and an output capacitor Co as shown in FIG. 13.

The switches of the synchronous rectifier may be formed by any suitable devices such as metal oxide semiconductor field effect transistor (MOSFET) devices, bipolar junction transistor (BJT) devices, super junction transistor (SJT) devices, insulated gate bipolar transistor (IGBT) devices and the like.

FIG. 13 illustrates a schematic diagram of a forward converter having a synchronous rectifier according to an embodiment of the present disclosure. This diagram is merely an example, which should not unduly limit the scope of the claims. One of ordinary skill in the art would recognize many variations, alternatives, and modifications. For example, the synchronous rectifier may be replaced by a diode rectifier depending on different applications and design needs. Furthermore, in some high power applications, each switch shown in FIG. 13 may be replaced by a plurality of switches connected in parallel.

The bias power supply shown in FIG. 13 is similar to the bias power supply shown in FIG. 3, and hence is not discussed in further detail. The primary side gate drive signal $G_{PRI}$ is determined by the PWM signal and the comparison result of the comparator U1. When the bias switch $S_{VDDP}$ is turned on and the bias winding $N_b$ charges the bias capacitor $C_{VDDP}$, the output signal of the comparator U1 overrides the PWM signal. As a result, the primary switch $S_M$ remains off until the charge of the bias capacitor $C_{VDDP}$ finishes. The detailed timing diagram of controlling the bias power supply shown in FIG. 13 will be discussed below with respect to FIG. 14.

It should be noted that the bias power supplies described above in FIGS. 3, 5-6 and 8-9 are also applicable to the forward converter shown in FIG. 11.

It should further be noted the power converters in FIGS. 3, 5-6, 8-9 and 11 can achieve better efficiency because the bias power supplies do not generate unnecessary power losses. First, the charge of the bias capacitor occurs only when it is necessary. Furthermore, the charge of the bias capacitor stops after the bias voltage reaches a predetermined threshold. Second, the current for charging the bias capacitor is diverted from a magnetizing current. These two conditions help the bias power supplies in FIGS. 3, 5-6, 8-9 and 11 achieve better efficiency.

Figure 14:
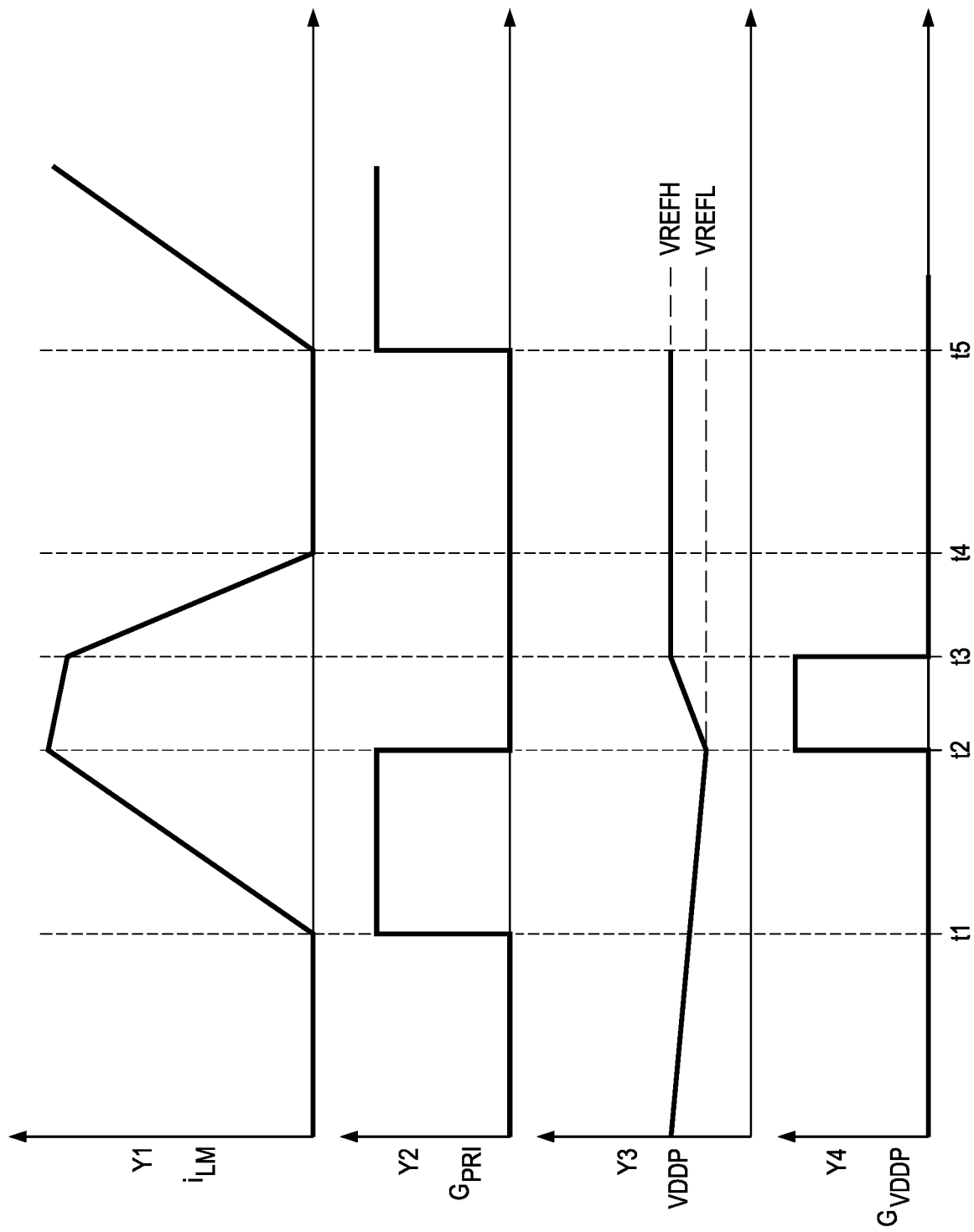
FIG. 14 illustrates an embodiment timing diagram of controlling the bias power supply shown in FIG. 13 in accordance with various embodiments of the present disclosure.

FIG. 14 illustrates an embodiment timing diagram of controlling the bias power supply shown in FIG. 13 in accordance with various embodiments of the present disclosure. The timing diagram shown in FIG. 14 is similar to that shown in FIG. 4, and hence is not discussed again to avoid repetition.

Figure 15:
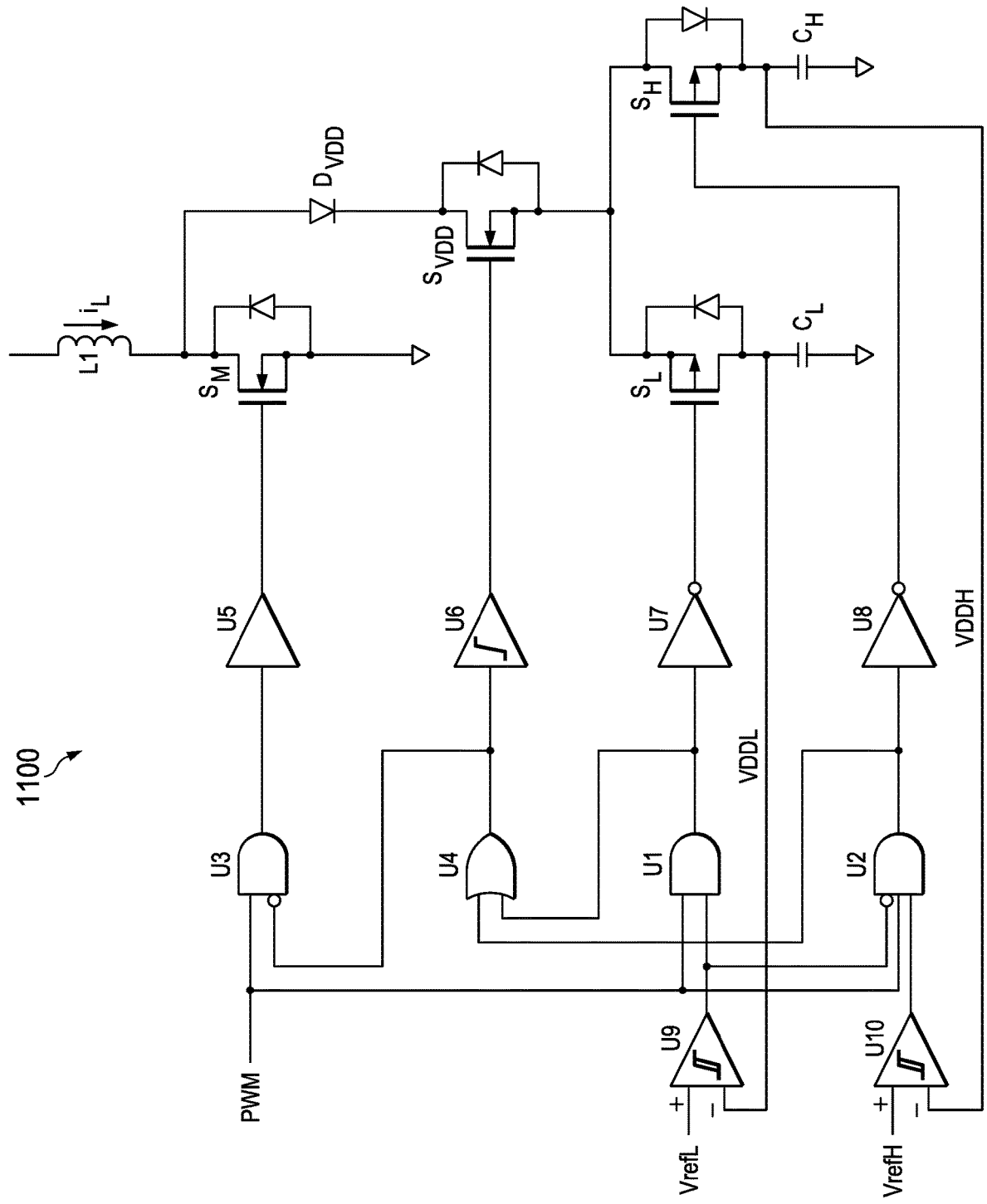
FIG. 15 illustrates a schematic diagram of a first implementation of a bias power supply of a switching converter in accordance with various embodiments of the present disclosure.

FIG. 15 illustrates a schematic diagram of a first implementation of a bias power supply of a switching converter in accordance with various embodiments of the present disclosure. The switching converter 1100 may be any suitable power converters comprising a magnetic device (e.g., an inductor) and a switch connected in series with the magnetic device. For example, in some embodiments, the switching converter 1100 can be an isolated power converter such as a full bridge power converter. In alternative embodiments, the switching converter 1100 can be a non-isolated power converter such as a four-switch buck boost converter.

The switching converter 1100 comprises a magnetic device L1. As shown in FIG. 15, the magnetic device L1 and the main switch $S_M$ are connected in series as shown in FIG. 15. In some embodiments, the magnetic device L1 is an inductor. In alternative embodiments, the magnetic device L1 is a bias winding of a transformer. Furthermore, the magnetic device L1 can be a primary winding or a secondary winding of a transformer.

The bias power supply generates two bias voltages, namely a low bias voltage VDDL and a high bias voltage VDDH. In some embodiments, the values of the low bias voltage VDDL and the high bias voltage VDDH are determined by references VrefL and VrefH respectively. Both VrefL and VrefH are predetermined and may vary depending on different applications and design needs.

The switch $S_M$, the diode $D_{VDD}$ and the bias switch $S_{VDD}$ are connected in a manner similar to that shown in FIG. 5. In order to establish two bias voltages, two switch-capacitor networks are connected to the bias switch $S_{VDD}$. A first switch $S_L$ and a first capacitor $C_L$ are connected in series between the bias switch $S_{VDD}$ and ground. The low bias voltage VDDL is established at the common node of the first switch $S_L$ and the first capacitor $C_L$. The gate of the first switch $S_L$ is controlled by a first control circuit formed by a first comparator U9, a first logic gate U1 and a first inverter U7. In some embodiments, the first logic gate U1 is implemented as an AND gate.

A second switch $S_H$ and a second capacitor $C_H$ are connected in series between the bias switch $S_{VDD}$ and ground. The high bias voltage VDDH is established at the common node of the second switch $S_H$ and the second capacitor $C_H$. The gate of the second switch $S_H$ is controlled by a second control circuit formed by a second comparator U10, a second logic gate U2 and a second inverter U8. In some embodiments, the second logic gate U2 is an AND gate.

The operating principle of the first control circuit is similar to that of the second control circuit except that the output of the first comparator U9 can override the output of the second comparator U10. In other words, when both the voltages of the bias capacitors $C_L$ and $C_H$ are lower than their respective references VrefL and VrefH, the charges of the bias capacitors $C_L$ and $C_H$ are applied sequentially. According to the logic circuit shown in FIG. 15, the bias capacitor $C_L$ is charged first. The logic circuit shown in FIG. 15 indicates the output signal of the first comparator U9 overrides the charge command generated by the second comparator U10. The bias capacitor $C_H$ cannot be charged until the bias capacitor $C_L$ is charged to a level over its reference voltage.

It should be noted that the charge sequence used in FIG. 15 is selected purely for demonstration purposes and are not intended to limit the various embodiments of the present disclosure to any particular charge sequence. One of ordinary skill in the art would recognize many variations, alternatives, and modifications. For example, the bias capacitor $C_H$ can be charged first by simply swapping the first control circuit and the second control circuit.

As shown in FIG. 15, an inductor current $i_L$ flows through the inductor. The inductor current may charge capacitors $C_L$ and/or $C_H$ if necessary. As indicated by the control circuits (logic gate U4) of the main switch $S_M$ and the bias switch $S_{VDD}$, the turn-on signal of the bias switch $S_{VDD}$ can override the PWM signal applied to the switch $S_M$. As a result, the charge of the capacitors $C_L$ and/or $C_H$ occurs before turning on the switch $S_M$. This timing sequence is similar to that shown in FIG. 7, and hence is not discussed again.

It should be noted FIG. 15 shows the first switch $S_L$ and the second switch $S_H$ are implemented as p-type transistors. This implementation is merely an example, which should not unduly limit the scope of the claims. One of ordinary skill in the art would recognize many variations, alternatives, and modifications. For example, the first switch $S_L$ and the second switch $S_H$ can be implemented as n-type transistors. In order to drive the n-type transistors, the drivers (e.g., U7 and U8) may be modified accordingly. Each driver is replaced by a buffer. In addition, the driver may include a level shifter because the sources of the n-type transistors are not connected to ground.

Figure 16:
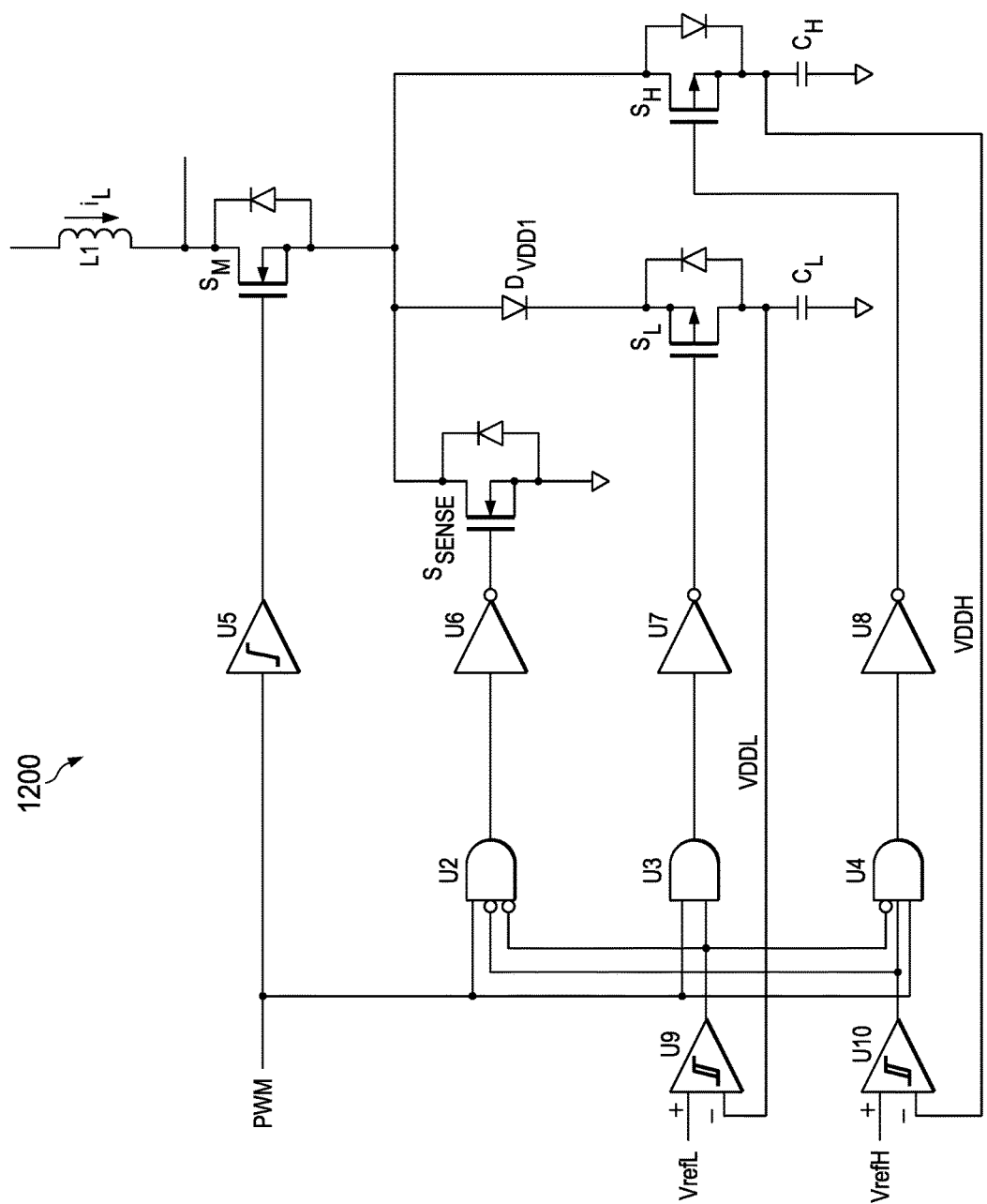
FIG. 16 illustrates a schematic diagram of a second implementation of a bias power supply of a switching converter in accordance with various embodiments of the present disclosure.

FIG. 16 illustrates a schematic diagram of a second implementation of a bias power supply of a switching converter in accordance with various embodiments of the present disclosure. The bias power supply of the switching converter 1200 shown in FIG. 16 is similar to that shown in FIG. 15 except that two switch-capacitor networks are connected to a common node of a main switch $S_M$ and a sense switch $S_{SENSE}$. The operating principle of the bias supply shown in FIG. 16 is similar to that described above with respect to FIG. 15, and hence is not discussed again.

It should be noted FIG. 16 shows the first switch $S_L$ and the second switch $S_H$ are implemented as p-type transistors. This implementation is merely an example, which should not unduly limit the scope of the claims. One of ordinary skill in the art would recognize many variations, alternatives, and modifications. For example, the first switch $S_L$ and the second switch $S_H$ can be implemented as n-type transistors. In order to drive the n-type transistors, the drivers (e.g., U7 and U8) may be modified accordingly. Each driver is replaced by a buffer. In addition, the driver may include a level shifter because the sources of the n-type transistors are not connected to ground.

It should further be noted a blocking diode $D_{VDD1}$ is connected between the switch $S_L$, and the common node of the main switch $S_M$ and the sense switch $S_{SENSE}$. The blocking diode $D_{VDD1}$ is employed to prevent the capacitor $C_L$ from being discharged when the voltage at the common node of the main switch $S_M$ and the sense switch $S_{SENSE}$ is lower than the voltage of the capacitor $C_L$.

One advantageous feature of having the configuration shown in FIG. 16 is only one high voltage switch (e.g., $S_M$) is necessary in some high voltage applications. For example, in some high voltage applications, switches $S_{SENSE}$, $S_L$ and $S_H$ can be implemented as low voltage transistors.

Figure 17:
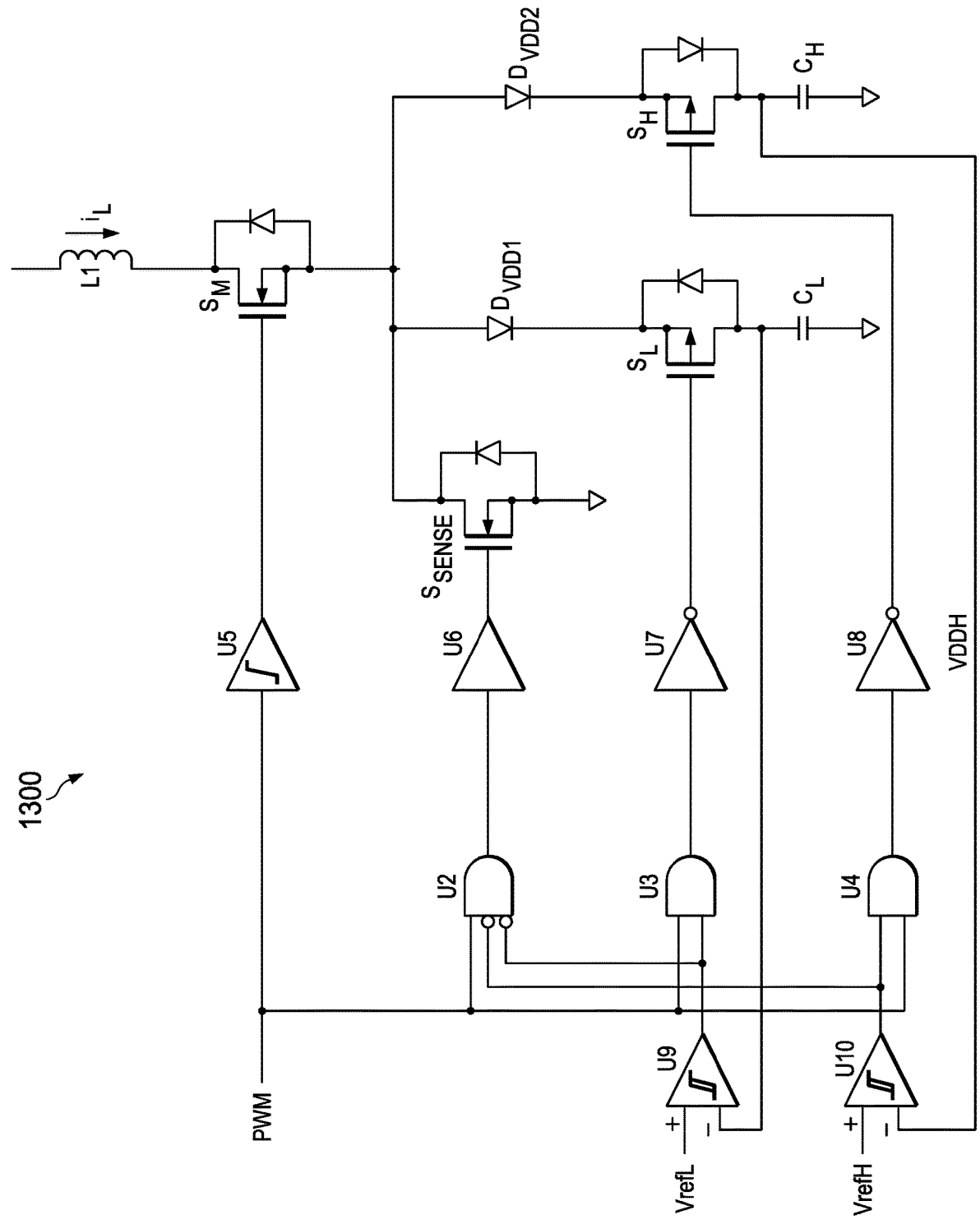
FIG. 17 illustrates a schematic diagram of a third implementation of a bias power supply of a switching converter in accordance with various embodiments of the present disclosure.

FIG. 17 illustrates a schematic diagram of a third implementation of a bias power supply of a switching converter in accordance with various embodiments of the present disclosure. The bias power supply of the switching converter 1300 shown in FIG. 17 is similar to that shown in FIG. 16 except that a second blocking diode $D_{VDD2}$ is connected in series with the switch $S_H$.

One advantageous feature of having the second blocking diode $D_{VDD2}$ is the capacitors $C_L$ and $C_H$ can be independently charged through the extra diode. In other words, it not necessary to consider the charge sequence between the capacitors $C_L$ and $C_H$.

It should be noted FIG. 17 shows the first switch $S_L$ and the second switch $S_H$ are implemented as p-type transistors. This implementation is merely an example, which should not unduly limit the scope of the claims. One of ordinary skill in the art would recognize many variations, alternatives, and modifications. For example, the first switch $S_L$ and the second switch $S_H$ can be implemented as n-type transistors. In order to drive the n-type transistors, the drivers (e.g., U7 and U8) may be modified accordingly. Each driver is replaced by a buffer. In addition, the driver may include a level shifter because the sources of the n-type transistors are not connected to ground.

Figure 18:
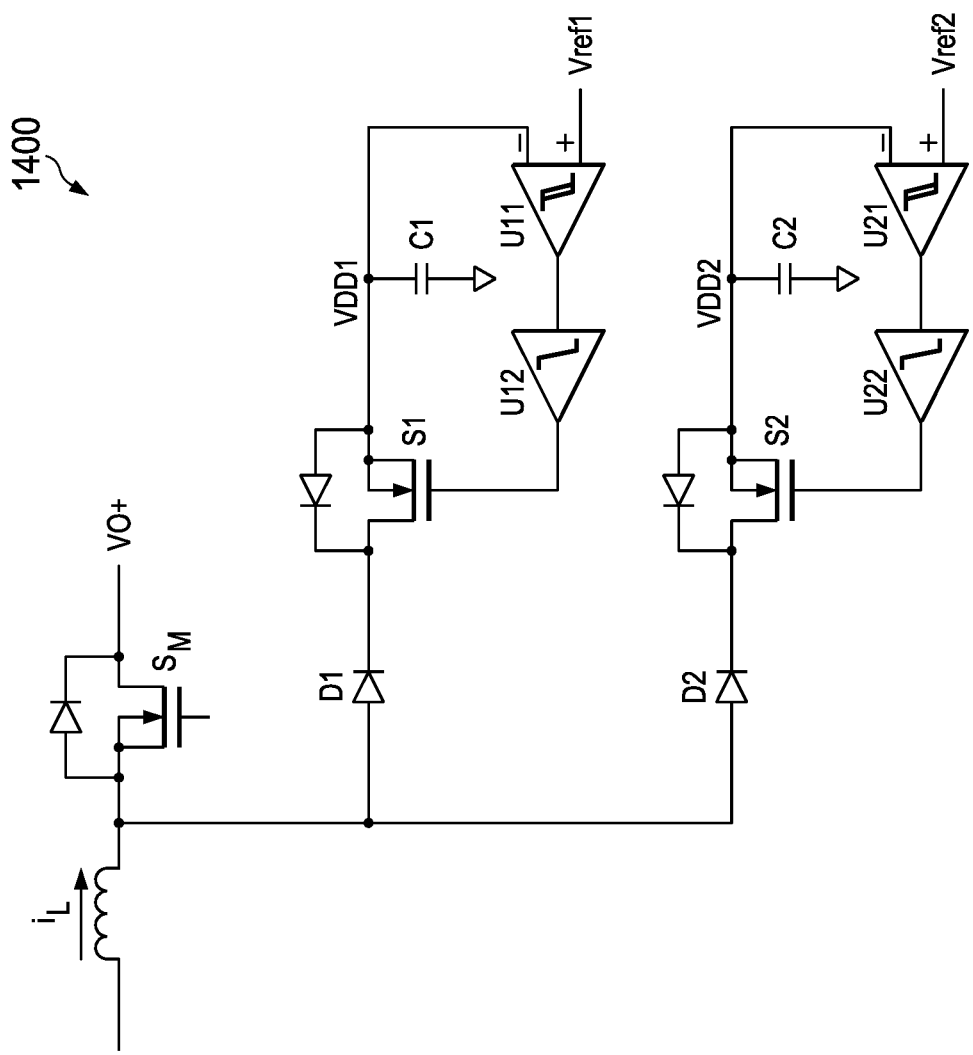
FIG. 18 illustrates a schematic diagram of a third implementation of a bias power supply of a switching converter in accordance with various embodiments of the present disclosure.

FIG. 18 illustrates a schematic diagram of a third implementation of a bias power supply of a switching converter in accordance with various embodiments of the present disclosure. The switching converter 1400 includes an inductor connected to the positive output of the switching converter 1400 through a main switch $S_M$.

The bias power supply includes two bias voltages, namely a first bias voltage VDD1 and a second bias voltage VDD2. The values of the first bias voltage VDD1 and the second bias voltage VDDH are determined by references Vref1 and Vref2 respectively. Both Vref1 and Vref2 are predetermined and may vary depending on different applications and design needs.

In order to establish two bias voltages, two diode-switch-capacitor networks are connected to the common node of the inductor and the switch $S_M$. A first diode D1, a first switch S1 and a first capacitor C1 are connected in series between the common node of the inductor and the switch $S_M$, and ground. The first bias voltage VDD1 is established at the common node of the first switch S1 and the first capacitor C1. The gate of the first switch S1 is controlled by a first control circuit formed by a first comparator U11 and a first level shifter U12.

A second diode D2, a second switch S2 and a second capacitor C2 are connected in series between the common node of the inductor and the switch $S_M$, and ground. The second bias voltage VDD2 is established at the common node of the second switch S2 and the second capacitor C2. The gate of the second switch S2 is controlled by a second control circuit formed by a second comparator U21 and a second level shifter U22.

The operating principle of the first control circuit and the second control circuit shown in FIG. 18 is similar to that of the second control circuit shown in FIG. 11, and hence is not discussed again herein.

It should be noted both the first diode D1 and the second diode D2 function as blocking diodes. One advantageous feature of having two blocking diode is the capacitors C1 and C2 can be independently charged through these two blocking diodes. In other words, it not necessary to consider the charge sequence between the capacitors C1 and C2.

It should further be noted the two bias voltages shown in FIGS. 15-18 are merely an example. One of ordinary skill in the art would recognize many variations, alternatives, and modifications. For example, depending on different applications and design needs, any number of bias voltages can be established based upon the circuit and control scheme described above with respect to FIGS. 15-18.

Figure 19:
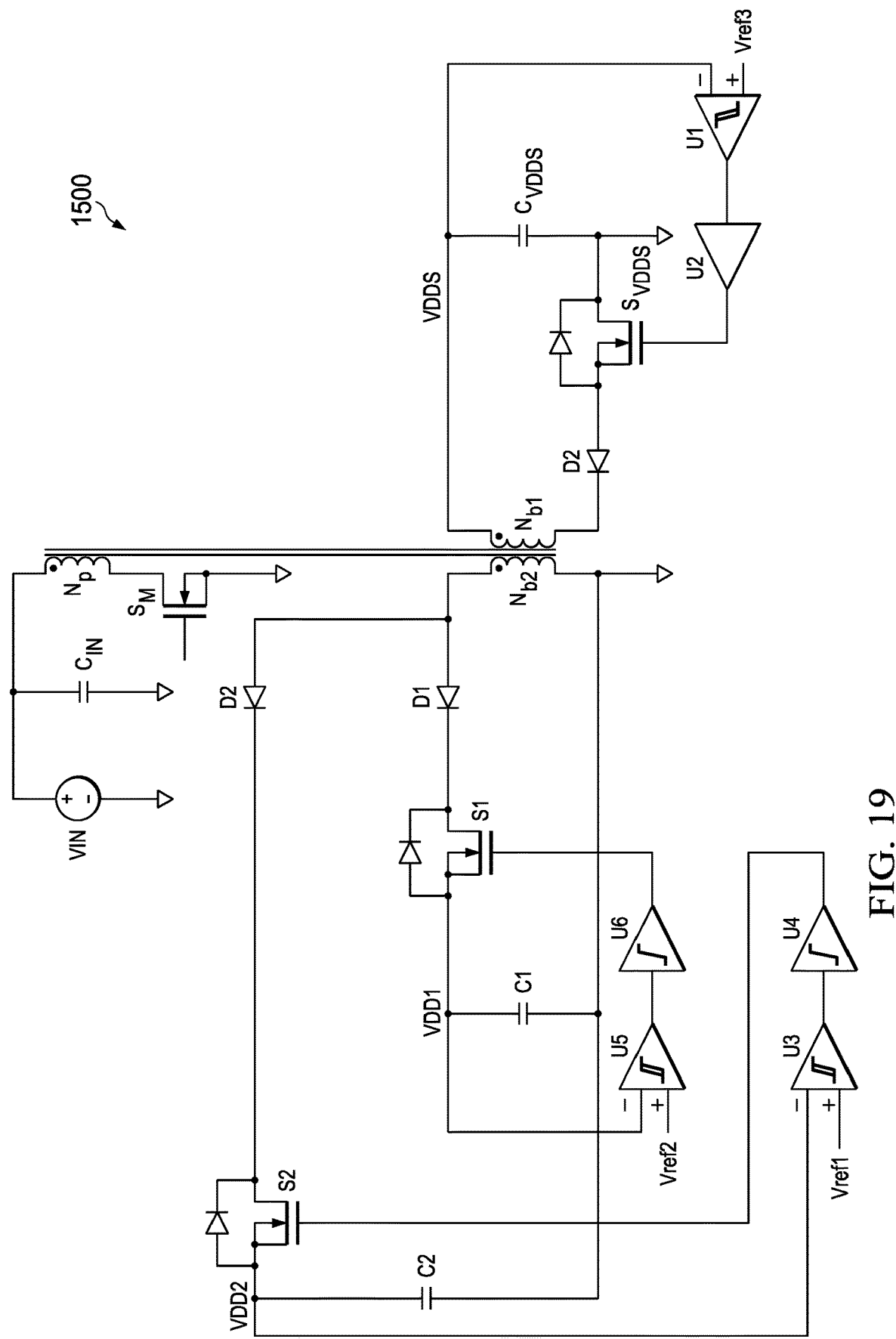
FIG. 19 illustrates a schematic diagram of an implementation of multiple bias power supplies of a switching converter in accordance with various embodiments of the present disclosure.

FIG. 19 illustrates a schematic diagram of an implementation of multiple bias power supplies of a switching converter in accordance with various embodiments of the present disclosure. FIG. 19 only shows a primary side of an isolated power converter 1500. Depending on different system configurations, the bias supplies shown in FIG. 19 can be applicable to different isolated power converters such as flyback converters, forward converters, half-bridge converters, full-bridge converters, push-pull converters, LLC resonant converters, any combinations thereof and the like.

The primary side bias power supply includes two bias voltages, namely a first bias voltage VDD1 and a second bias voltage VDD2. The second bias power supply includes one bias voltage, namely a secondary bias voltage VDDS. The operating principle of the primary side bias power supply is similar to that described above with respect to FIG. 3, and hence is not discussed herein. The operating principle of the secondary side bias power supply is similar to that described above with respect to FIG. 12, and hence is not discussed herein.

It should be noted that the bias power supply configuration shown in FIG. 15 is merely an example. A personal skilled in the art would understand any combinations of the primary bias power supplies and the secondary bias power supplies shown in this disclosure can be used to provide bias power for the isolated power converter 1500.

One advantageous feature of having the bias power supplies shown in FIGS. 15-19 is multiple bias power supplies can be efficiently generated through using the magnetizing current of a power converter. The power converter can be a non-isolated power converter. Alternatively, the power converter can be an isolated power converter.

For an isolated power converter, the multiple bias power supplies can be placed at a primary side of the power converter (e.g., the bias power supplies shown in FIGS. 15-17). Alternatively, the multiple bias power supplies can be placed at a secondary side of the power converter (e.g., the bias power supplies shown in FIG. 18). Moreover, the multiple bias power supplies can be placed at both the primary side and the secondary side of the power converter (e.g., the bias power supplies shown in FIG. 19).

Figure 20:
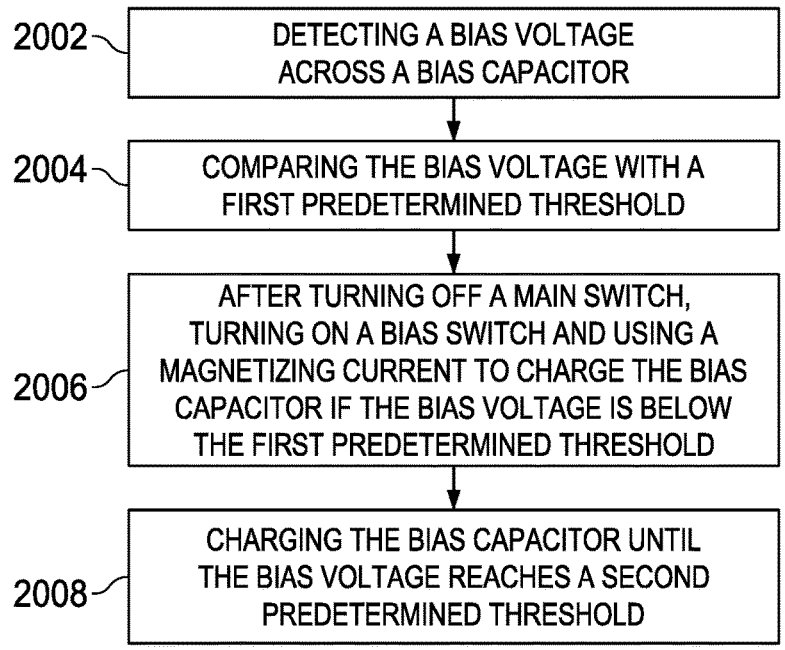
FIG. 20 illustrates a flow chart of controlling the bias power supply in FIG. 3 in accordance with various embodiments of the present disclosure.

FIG. 20 illustrates a flow chart of controlling the bias power supply in FIG. 3 in accordance with various embodiments of the present disclosure. This flowchart shown in FIG. 20 is merely an example, which should not unduly limit the scope of the claims. One of ordinary skill in the art would recognize many variations, alternatives, and modifications. For example, various steps illustrated in FIG. 20 may be added, removed, replaced, rearranged and repeated.

Referring back to FIGS. 3-4, the bias power supply of the flyback converter 300 comprises a bias switch and a diode connected in series between a bias winding and a bias capacitor. A comparator U1 is used to monitor the voltage across the bias capacitor. When the voltage across the bias capacitor is lower than a predetermined value, the bias switch is turned on and the bias capacitor is charged by a magnetizing current of the bias winding.

At step 2002, the comparator U1 is used to detect a voltage across the bias capacitor. As shown in FIG. 3, the inverting input of the comparator U1 is connected to a positive terminal of the bias capacitor.

At step 2004, the detected bias capacitor voltage is compared with a first predetermined threshold. At step 2006, if the detected bias voltage is less than the first predetermined threshold, the bias switch is turned on immediately after a main switch has been turned off and a magnetizing current charges the bias capacitor.

At step 2008, the magnetizing current keeps charging the bias capacitor until the bias voltage is over a second predetermined threshold. In some embodiments, the second predetermined threshold is greater than the first predetermined threshold.

Figure 21:
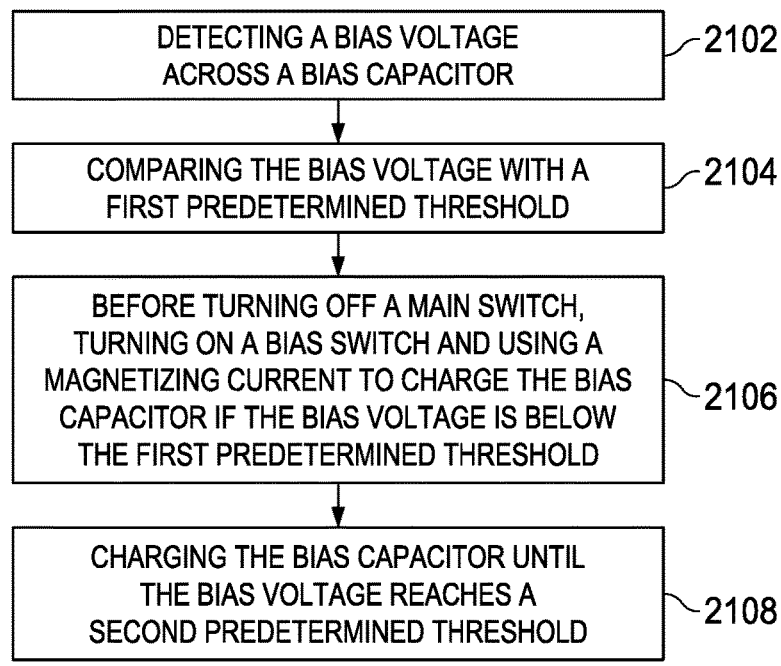
FIG. 21 illustrates a flow chart of controlling the bias power supply in FIG. 7 in accordance with various embodiments of the present disclosure.

FIG. 21 illustrates a flow chart of controlling the bias power supply in FIG. 7 in accordance with various embodiments of the present disclosure. This flowchart shown in FIG. 21 is merely an example, which should not unduly limit the scope of the claims. One of ordinary skill in the art would recognize many variations, alternatives, and modifications. For example, various steps illustrated in FIG. 21 may be added, removed, replaced, rearranged and repeated.

Referring back to FIGS. 6-7, the bias power supply of the flyback converter 500 comprises a bias switch and a diode connected in series between a primary winding and a bias capacitor. A comparator U1 is used to monitor the voltage across the bias capacitor. When the voltage across the bias capacitor is lower than a predetermined value, the bias switch is turned on and the bias capacitor is charged by a magnetizing current of the primary winding.

At step 2102, the comparator is used to detect a voltage across the bias capacitor. As shown in FIG. 6, the inverting input of the comparator U1 is connected to a positive terminal of the bias capacitor.

At step 2104, the detected bias capacitor voltage is compared with a first predetermined threshold. At step 2106, if the detected bias voltage is less than the first predetermined threshold, the bias switch is turned on and a magnetizing current charges the bias capacitor. During the time interval of turning on the bias switch, the main switch remains off.

At step 2108, the magnetizing current keeps charging the bias capacitor until the bias voltage is over a second predetermined threshold. In some embodiments, the second predetermined threshold is greater than the first predetermined threshold. The main switch is turned on immediately after the bias switch has been turned off.

Figure 22:
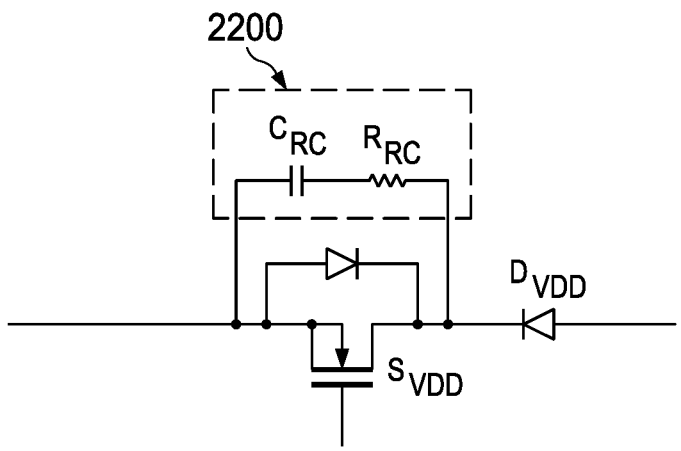
FIG. 22 illustrates a schematic diagram of a first implementation of the snubber in accordance with various embodiments of the present disclosure.
Figure 23:
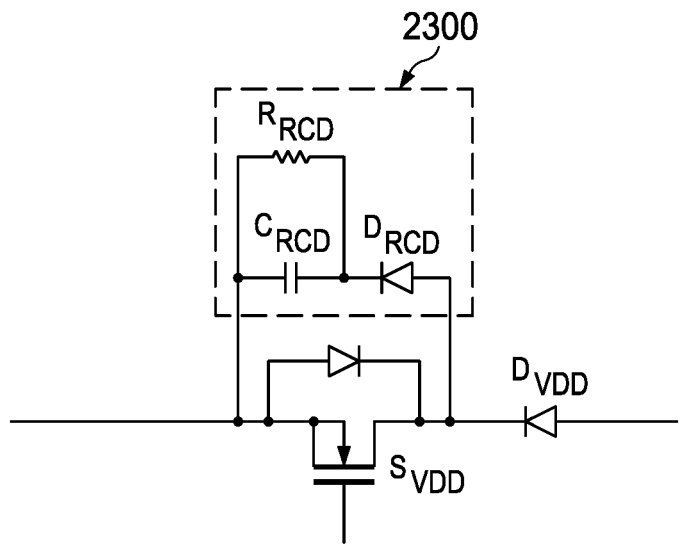
FIG. 23 illustrates a schematic diagram of a second implementation of the snubber in accordance with various embodiments of the present disclosure.
Figure 24:
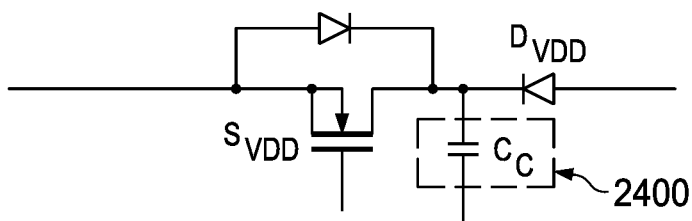
FIG. 24 illustrates a schematic diagram of a third implementation of the snubber in accordance with various embodiments of the present disclosure.

FIGS. 22-24 illustrate various implementations of a snubber used in a bias power supply. The snubbers shown in FIGS. 22-24 are applicable to any of the bias switches illustrated in FIGS. 3, 5-6, 8-9, 11-13 and 15-19.

FIG. 22 illustrates a schematic diagram of a first implementation of the snubber in accordance with various embodiments of the present disclosure. The snubber 2200 includes a capacitor $C_{RC}$ and a resistor $R_{RC}$ connected in series. The snubber 2200 is connected in parallel with the bias switch $S_{VDD}$. As shown in FIG. 22, the bias switch $S_{VDD}$ and the blocking diode $D_{VDD}$ are connected in series. More particularly, a cathode of the blocking diode $D_{VDD}$ is directly connected to a cathode of a body diode of the bias switch $S_{VDD}$.

The snubber 2200 is employed to reduce the turn-off ringing overshoot across the bias switch $S_{VDD}$. Depending on different applications and design needs, the values of the capacitor $C_{RC}$ and the resistor $R_{RC}$ are selected accordingly.

It should be noted that the n-type bias switch shown in FIG. 22 is merely an example. Depending on different applications and design needs, the bias switch $S_{VDD}$ may be implemented as a p-type transistor.

FIG. 23 illustrates a schematic diagram of a second implementation of the snubber in accordance with various embodiments of the present disclosure. The snubber 2300 includes a capacitor $C_{RC}$, a resistor $R_{RC}$ and a diode $D_{RCD}$. The capacitor $C_{RC}$ and the resistor $R_{RC}$ are connected in parallel to form a resistor-capacitor network. The resistor-capacitor network is further connected in series with the diode $D_{RCD}$. The snubber 2300 is connected in parallel with the bias switch $S_{VDD}$.

The snubber 2300 is employed to reduce the turn-off ringing overshoot across the bias switch $S_{VDD}$. Depending on different applications and design needs, the values of the capacitor $C_{RC}$ and the resistor $R_{RC}$ are selected accordingly.

FIG. 24 illustrates a schematic diagram of a third implementation of the snubber in accordance with various embodiments of the present disclosure. The snubber 2400 includes a capacitor $C_C$. The capacitor $C_C$ is connected to a common node of the bias switch $S_{VDD}$ and the blocking diode $D_{VDD}$ as shown in FIG. 24.

The snubber 2400 is employed to slow down the turn-off ringing overshoot across the bias switch $S_{VDD}$. Depending on different applications and design needs, the value of the capacitor $C_C$ is selected accordingly.

Figure 25:
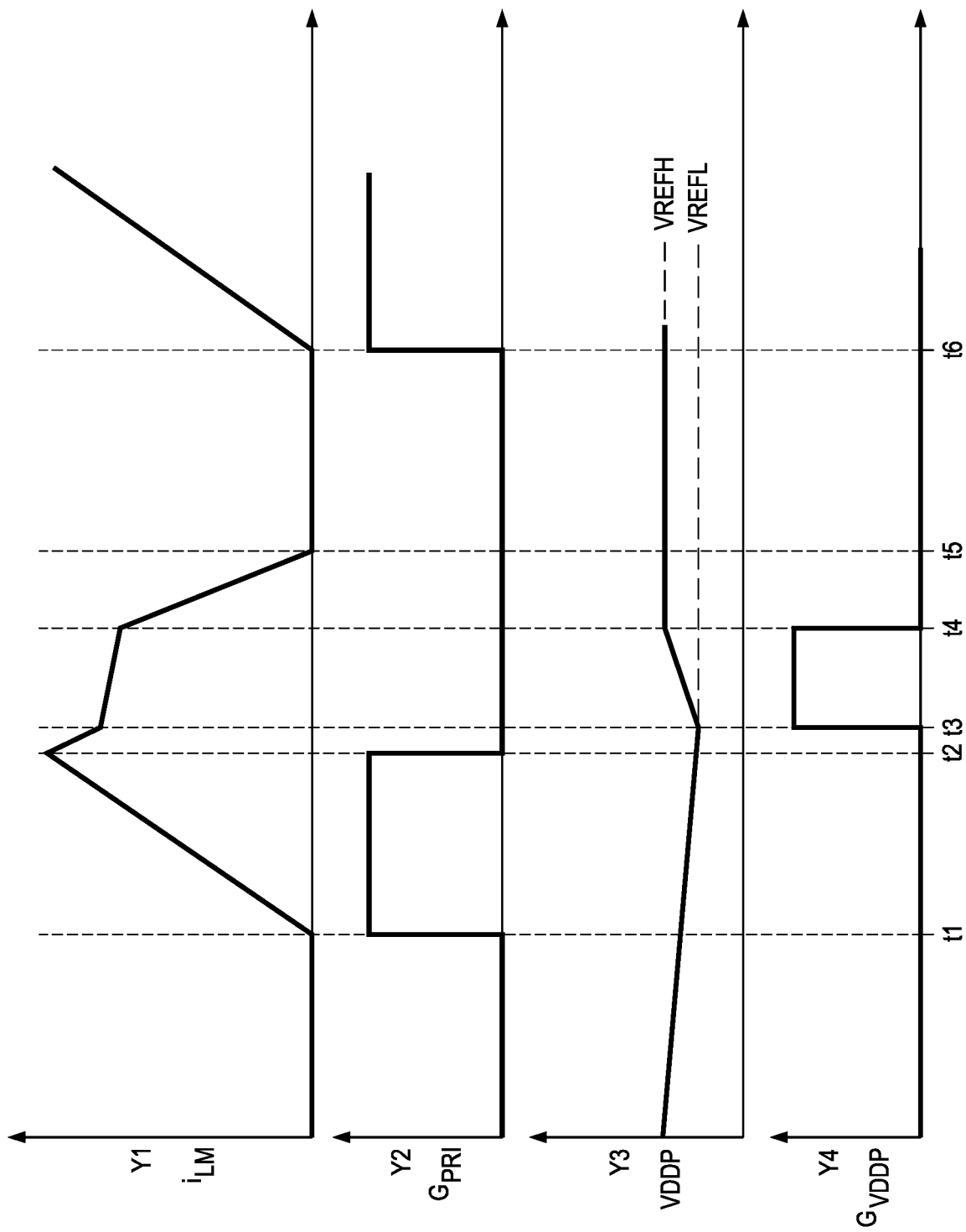
FIG. 25 illustrates another embodiment timing diagram of controlling the bias power supply shown in FIG. 3 in accordance with various embodiments of the present disclosure.

FIG. 25 illustrates another embodiment timing diagram of controlling the bias power supply shown in FIG. 3 in accordance with various embodiments of the present disclosure. The horizontal axis of FIG. 25 represents intervals of time. There are four vertical axes. The first vertical axis Y1 represents the magnetizing current flowing through the primary side of the transformer T1 shown in FIG. 3. The second vertical axis Y2 represents the gate drive signal of the primary side switch $S_M$. The third vertical axis Y3 represents the bias voltage VDDP shown in FIG. 3. The fourth vertical axis Y4 represents the gate drive signal of the bias switch $S_{VDDP}$.

At time t1, the primary side switch $S_M$ is turned on. As a result of turning on the primary side switch $S_M$, the magnetizing current ramps up from time t1 until time 2 when the primary side switch $S_M$ is turned off. From time t1 to time t2, the bias voltage VDDP drops as shown in FIG. 25.

At time t2, the primary side switch $S_M$ is turned off. From t2 to t3, the magnetizing current is reset by the RCD reset device shown in FIG. 3. The magnetizing current $i_{LM}$ decreases in a linear manner as shown in FIG. 25. From t2 to t3, the magnetizing current is of a slope of $-V_C/L_M$, where $V_C$ is the voltage across the capacitor $C_{RCD}$.

At time t3, the bias voltage drops below the lower threshold VREFL, the bias switch $S_{VDDP}$ is turned on as indicated by the gate drive signal $G_{VDDP}$. In response to the turned-on bias switch $S_{VDDP}$, the magnetizing current from the bias winding $N_b$ starts to charge the bias capacitor $C_{VDDP}$ and the bias voltage VDDP increases in a linear manner as shown in FIG. 25.

At time t4, the bias voltage reaches the upper threshold VREFH, the output of the comparator U1 transitions from a logic high state to a logic low state. In response to this logic state change, the bias switch $S_{VDDP}$ is turned off at time t4 as indicated by the gate drive signal $G_{VDDP}$. During the time interval from t3 to t4, the magnetizing current is partially reset by the bias voltage VDDP. The magnetizing current is of a slope of $-VDDP/L_M$, where $L_M$ is the magnetizing inductance of the transformer T1.

During the time interval from t4 to t5, the magnetizing current is reset by the RCD reset device. The magnetizing current $i_{LM}$ decreases in a linear manner as shown in FIG. 25.

From t4 to t5, the magnetizing current is of a slope of $-V_C/L_M$, where $V_C$ is the voltage across the capacitor $C_{RCD}$. At t5, the magnetizing current is reset to zero. At time t6, a new switching cycle starts and the magnetizing current $i_{LM}$ starts to increase after the primary switch $S_M$ has been turned on.

As described above with respect to FIGS. 3-4, the bias voltage VDDP is less than or equal to the lower end of the output voltage of the flyback converter 300. Since the bias voltage VDDP is less than or equal to the lower end of the output voltage of the flyback converter 300, the magnetizing current can charge the bias capacitor in any time interval from t2 to t5.

It should be noted the bias capacitor charge time (from t3 to t4) shown in FIG. 25 is merely an example, which should not unduly limit the scope of the claims. One of ordinary skill in the art would recognize many variations, alternatives, and modifications. For example, the bias capacitor charge may occur immediately after the main switch has been turned off. Alternatively, the bias capacitor charge may occur in the middle of the magnetizing current resetting period (e.g., from t2 to t5). Furthermore, the bias capacitor charge may occur at the end of the magnetizing current resetting period (e.g., from t2 to t5).

Figure 26:
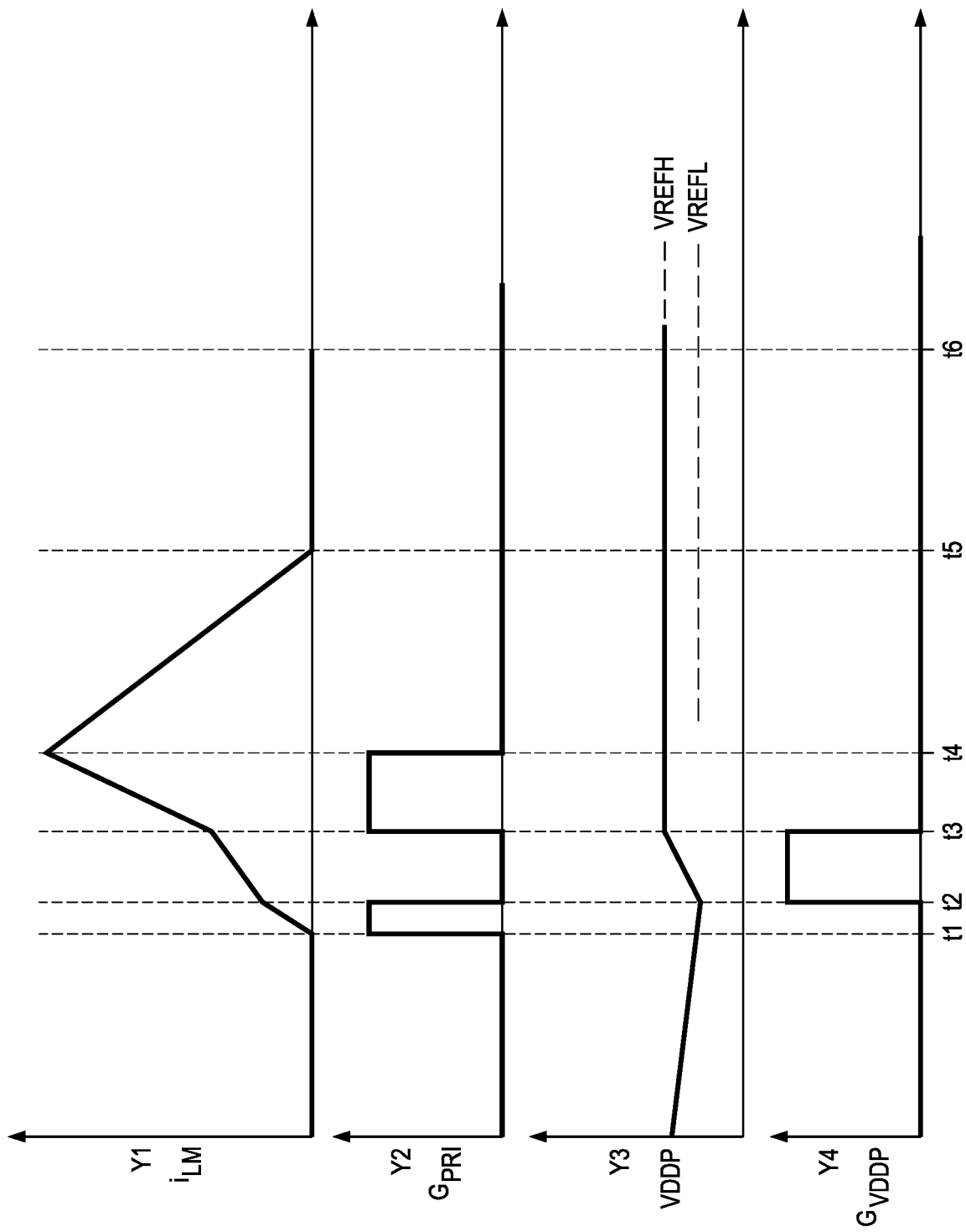
FIG. 26 illustrates another embodiment timing diagram of controlling the bias power supply shown in FIG. 5 in accordance with various embodiments of the present disclosure.

FIG. 26 illustrates another embodiment timing diagram of controlling the bias power supply shown in FIG. 5 in accordance with various embodiments of the present disclosure. The horizontal axis of FIG. 26 represents intervals of time. There are four vertical axes. The first vertical axis Y1 represents the magnetizing current flowing through the primary side of the transformer T1 shown in FIG. 5. The second vertical axis Y2 represents the gate drive signal of the primary side switch $S_M$. The third vertical axis Y3 represents the bias voltage VDDP. The fourth vertical axis Y4 represents the gate drive signal of the bias switch of the bias power supply.

At t1, the primary side switch $S_M$ is turned on. As a result of turning on the primary side switch $S_M$, the magnetizing current ramps up from time t1 to time t2 until the bias switch is turned on. During the time interval from t1 to t2, the magnetizing current is of a slope of $VIN/L_M$.

At time t2, after the bias voltage reaches the lower threshold VREFL, the output of the comparator U1 transitions from a logic low state to a logic high state. The PWM signal is applied to both the primary switch $S_M$ and the bias switch $S_{VDDP}$. Both the PWM signal and the output of the comparator U1 have a logic high state. As a result, the first logic gate U2 generates a logic high signal, which is used to turn on the bias switch $S_{VDDP}$ through the level shifter U3. Also at time t2, the logic high state from the comparator U1, after passing an inverter, turns off the main switch SM. As shown in FIG. 26, from t2 to t3, the bias switch gate drive signal $G_{VDDP}$ is of a logic high state.

In response to the turned-on bias switch $S_{VDDP}$, the magnetizing current of the transformer T1 charges the bias capacitor $C_{VDDP}$ in a linear manner from t2 to t3. During the time interval from t2 to t3, the magnetizing current is of a slope of $(VIN-VDDP)/L_M$, where $L_M$ is the magnetizing inductance of the transformer T1. During the time interval from t2 to t3, the primary switch $S_M$ is off as shown in FIG. 26.

At time t3, after the bias voltage VDDP reaches VREFH, the output of the comparator U1 transitions from a logic high state to a logic low state. In response to this logic state change, the bias switch $S_{VDDP}$ is turned off and the primary side switch $S_M$ is turned on. As a result of turning on the primary side switch $S_M$, the magnetizing current ramps up from time t3 to time t4 until the primary side switch $S_M$ is turned off. During the time interval from t3 to t4, the magnetizing current is of a slope of $VIN/L_M$.

It should be noted the bias capacitor charge time (from t2 to t3) shown in FIG. 26 is merely an example, which should not unduly limit the scope of the claims. One of ordinary skill in the art would recognize many variations, alternatives, and modifications. For example, the bias capacitor charge may occur immediately after the PWM signal has been applied to the bias switch and the main switch. Alternatively, the bias capacitor charge may occur in the middle of the PWM turn-on period (e.g., from t1 to t4). Furthermore, the bias capacitor charge may occur at the end of the PWM turn-on period (e.g., from t1 to t4).

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
a controller configured to generate a pulse-width modulation (PWM) signal for controlling a power switch of a forward converter;
a bias switch and a bias capacitor connected in series and coupled to a bias winding of the forward converter; and
a comparator having a first input connected to the bias capacitor, a second input connected to a predetermined reference, and an output configured to generate a signal for controlling the bias switch to allow a magnetizing current from the bias winding to charge the bias capacitor when a voltage across the bias capacitor is less than the predetermined reference, wherein the output of the comparator overrides the PWM signal when the bias switch is turned on and the bias winding charges the bias capacitor.

2. The apparatus of claim 1, further comprising:
a diode connected in series with the bias switch, wherein:
an anode of the diode is connected to the bias winding; and
a cathode of the diode is connected to the bias switch.

3. The apparatus of claim 2, wherein:
the bias switch is an n-type transistor, and wherein:
a source of the bias switch is connected to the diode; and
a drain of the bias switch is connected to the bias capacitor.

4. The apparatus of claim 1, further comprising:
a first logic gate and a first buffer, wherein:
a first input of the first logic gate is connected to the output of the comparator;
a second input of the first logic gate is configured to receive the PWM signal for controlling the power switch through a first inverter;
an input of the first buffer is connected to an output of the first logic gate; and
an output of the first buffer is connected to a gate of the bias switch.

5. The apparatus of claim 4, wherein:
the first logic gate is an AND gate; and
the first buffer is a level shifter.

6. The apparatus of claim 1, further comprising:
a second logic gate and a second buffer, wherein:
a first input of the second logic gate is configured to receive the PWM signal for controlling the power switch;
a second input of the second logic gate is connected to the output of the comparator through a second inverter;
an input of the second buffer is connected to an output of the second logic gate; and
an output of the second buffer is connected to a gate of the power switch.

7. The apparatus of claim 6, wherein:
the second logic gate is an AND gate; and
the second buffer is a gate driver.

8. The apparatus of claim 1, wherein:
the forward converter comprises a primary winding, the power switch and a sense resistor connected in series between an input power source and ground; and
a reset circuit connected between the input power source and a common node of the primary winding and the power switch.

9. The apparatus of claim 8, wherein:
the reset circuit is a RCD reset device comprising a reset diode, a reset capacitor and a reset resistor, and wherein:
the reset capacitor and the reset resistor are connected in parallel between the input power source and the reset diode;
an anode of the reset diode is connected to the common node of the primary winding and the power switch; and
a cathode of the reset diode is connected to the reset capacitor and the reset resistor.

10. The apparatus of claim 8, further comprising:
a secondary winding magnetically coupled to the primary winding;
a synchronous rectifier coupled to the secondary winding; and
an L-C filter coupled to the synchronous rectifier.

11. A method comprising:
generating a pulse-width modulation (PWM) signal for controlling a power switch of a forward converter;
detecting a voltage across a bias capacitor of the forward converter;
comparing, by a comparator, the voltage across the bias capacitor with a predetermined threshold;
turning on a bias switch connected in series with the bias capacitor so as to make a magnetizing current charge the bias capacitor when the voltage across the bias capacitor is less than the predetermined threshold; and
turning off the bias switch after the voltage across the bias capacitor is greater than another predetermined threshold, wherein an output of the comparator overrides the PWM signal when the bias switch is turned on and a bias winding charges the bias capacitor.

12. The method of claim 11, further comprising:
turning on the bias switch immediately after the power switch has been turned off.

13. The method of claim 12, further comprising:
after turning off the bias switch, configuring a resetting circuit to reset the forward converter.

14. The method of claim 11, wherein:
the forward converter comprises a transformer having the bias winding, a primary winding and a secondary winding and a power switch connected in series with the primary winding.

15. The method of claim 14, wherein:
the bias switch and the bias capacitor are connected in series and coupled to the bias winding of the forward converter.

16. The method of claim 15,
the comparator having a first input connected to the bias capacitor, a second input connected to a predetermined reference and the output configured to generate a signal for controlling the bias switch to allow the magnetizing current to charge the bias capacitor when the voltage across the bias capacitor is less than the predetermined reference.

17. A system comprising:
an inductor and a power switch connected in series;
a first bias switch and a first bias capacitor connected in series and coupled to a common node of the inductor and the power switch;
a first comparator having a first input connected to the first bias capacitor, a second input connected to a first predetermined reference and an output configured to generate a first signal for controlling the first bias switch to allow a magnetizing current from the inductor to charge the first bias capacitor when a first voltage across the first bias capacitor is less than the first predetermined reference;
a second bias switch and a second bias capacitor connected in series and coupled to the common node of the inductor and the power switch; and
a second comparator having a first input connected to the second bias capacitor, a second input connected to a second predetermined reference and an output configured to generate a second signal for controlling the second bias switch to allow the magnetizing current from the inductor to charge the second bias capacitor when a second voltage across the second bias capacitor is less than the second predetermined reference.

18. The system of claim 17, further comprising:
a first level shifter connected between the output of the first comparator and a first gate of the first bias switch; and
a second level shifter connected between the output of the second comparator and a second gate of the second bias switch.

19. The system of claim 17, further comprising:
a first diode connected between the first bias switch, and the common node of the inductor and the power switch; and
a second diode connected between the second bias switch, and the common node of the inductor and the power switch.

20. The system of claim 19, wherein:
a first anode of the first diode and a second anode of the second diode are connected to the common node of the inductor and the power switch;
a first cathode of the first diode is connected to the first bias switch; and
a second cathode of the second diode is connected to the second bias switch.

* * * * *